United States Patent [19]

Miyake

[11] Patent Number: 5,303,218
[45] Date of Patent: Apr. 12, 1994

[54] DIGITAL RECORDER FOR REPRODUCING ONLY REQUIRED PARTS OF AUDIO SIGNALS WHEREIN A PLURALITY OF PARTS OF AUDIO SIGNALS ARE STORED ON A SAME TRACK OF A RECORDING MEDIUM

[75] Inventor: Atsushi Miyake, Tachikawa, Japan

[73] Assignee: Casio Computer Co., Ltd., Tokyo, Japan

[21] Appl. No.: 850,682

[22] Filed: Mar. 10, 1992

[30] Foreign Application Priority Data

Mar. 13, 1991 [JP] Japan ................................. 3-074057

[51] Int. Cl.⁵ .............................................. G11B 5/09
[52] U.S. Cl. .................................... 369/48; 360/19.1; 369/32; 369/59
[58] Field of Search .................... 369/47, 48, 60, 30, 369/31, 32, 59; 360/32, 39, 46, 49, 51, 19.1, 22; 358/342, 341, 343

[56] References Cited

U.S. PATENT DOCUMENTS 4,758,907 7/1988 Okamoto et al. .................... 360/32
4,939,595 7/1990 Yoshimoto et al. .................. 369/32
4,949,323 8/1990 Yoshida .............................. 369/32
5,105,412 4/1992 Yoshio ............................... 369/48

OTHER PUBLICATIONS

JAS Journal, Apr. 1989, pp. 16–22.

Primary Examiner—Aristotelis Psitos
Assistant Examiner—Thang V. Tran
Attorney, Agent, or Firm—Frishauf, Holtz, Goodman & Woodward

[57] ABSTRACT

An audio input/output device which executes an input-/output operation of audio data is provided on its output side with a plurality of output channels. Audio data is divided into a plurality of sectioned data, each of which forms an event. A control track is stored, in which event identifying index data are disposed in the order of reproduction of the events and channel identifying index data for designating one of the output channels are assigned to respective events. A desired output channel is selected from the plurality of output channels in accordance with the channel identifying index data and audio signals involved in the relevant events are supplied to the selected output channel.

12 Claims, 16 Drawing Sheets

FIG. 14

| ETS-1 H/M/S/SAMPLE | EVENTS | OUTPUT CHANNELS |
|---|---|---|
| 00:00:00"00000 | ① | A |
| 00:00:48"00000 | ⑫ | B |
| 00:01:12"00000 | ① | B |
| 00:02:00"00000 | ⑫ | A |
| 00:02:24"00000 | ⑬ | A |
| 00:03:48"00000 | ⑩ | A |

| ETS-2 H/M/S/SAMPLE | EVENTS | OUTPUT CHANNELS |
|---|---|---|
| 00:00:00"00000 | ④ | A |
| 00:00:36"00000 | ④ | A |
| 00:01:12"00000 | ④ | A |
| 00:02:24"00000 | ④ | A |
| 00:03:00"00000 | ⑪ | A |
| 00:03:12"00000 | ⑪ | A |
| 00:03:24"00000 | ⑨ | A |

| ETS-3 H/M/S/SAMPLE | EVENTS | OUTPUT CHANNELS |
|---|---|---|
| 00:00:00"00000 | ③ | A |
| 00:00:48"00000 | ⑭ | B |
| 00:01:12"00000 | ③ | B |
| 00:02:00"00000 | ⑭ | B |
| 00:02:24"00000 | ⑮ | A |
| 00:02:30"00000 | ⑦ | A |
| 00:03:00"00000 | ③ | A |

FIG.15

| EVENT No. | ORIGINAL TRACK | START POINT | END POINT | GROUP | ATTRIBUTE |
|---|---|---|---|---|---|
| ① | Tr1 | 00000 | 00799 | | E |
| ② | Tr2 | 10000 | 11199 | | E |
| ③ | Tr3 | 20000 | 20799 | | E |
| ④ | Tr2 | 11200 | 11799 | | E |
| ⑤ | | | | 12+13 | G |
| ⑥ | Tr3 | 20800 | 21799 | | E |
| ⑦ | | | | 14+15 | G |
| ⑧ | Tr2 | 11800 | 12499 | | E |
| ⑨ | Tr2 | 12500 | 12899 | | E |
| ⑩ | Tr1 | 01800 | 02099 | | E |
| ⑪ | Tr3 | 22300 | 22499 | | E |
| ⑫ | Tr1 | 00800 | 01199 | | E |
| ⑬ | Tr1 | 01200 | 01799 | | E |
| ⑭ | Tr3 | 21800 | 22199 | | E |
| ⑮ | Tr3 | 22200 | 22229 | | E |
| ⑯ | | | | 6+8 | G |
| ⑰ | | | | 12+15 | G |
| ⑱ | Tr3 | 22400 | 22499 | | B |

FIG.16

|  | START | END | OUTPT CHANNEL |
|---|---|---|---|
| EVENT 1 | 0 0 0 0 0 | 0 0 7 9 9 |  |
| EVENT 2 | 0 0 8 0 0 | 0 1 1 9 9 |  |

DIGITAL RECORDER FOR REPRODUCING ONLY REQUIRED PARTS OF AUDIO SIGNALS WHEREIN A PLURALITY OF PARTS OF AUDIO SIGNALS ARE STORED ON A SAME TRACK OF A RECORDING MEDIUM

BACKGROUND OF THE INVENTION

1. Field of the Invention

The present invention relates to a digital recorder which is capable of recording, reproducing and/or editing an audio signal using digital techniques.

2. Description of the Related Art

Conventionally, as a method of recording, reproducing and editing an audio signal, a magnetic recording and reproducing technique is employed in which an analog audio signal is recorded on a magnetic tape, and the recorded signal is reproduced and edited. Since this prior art involves a recording and reproducing process for a signal in an analog form, deterioration in sound quality is inevitable. In particular, the deterioration will be prominent when once-recorded audio signal is dubbed.

Further, use of the magnetic tape as a recording medium raises problems such that it takes much time to reach a target editing point on the magnetic tape, and editing requires that the target recording portion of the magnetic tape be physically cut and pasted or be copied on somewhere else before the editing is actually executed.

The problem of deterioration in sound quality can be overcome by employing a technical means that codes a signal into a digital form and records on a magnetic tape. However, there still remains a shortcoming concerning location of a starting point for edition and freedom of edition due to the use of a sequential-access type recording medium.

Recently, there has been proposed a solution to the conventional problems which uses a hard disk or a magneto-optical disk as a memory medium. For instance, refer to U.S. Ser. No. 07/690,710 filed on Apr. 24, 1991, inventor: Nobuo IIZUKA; U.S. Ser. No. 07/752,876 filed on Aug. 30, 1991, inventor: Atsushi MIYAKE; U.S. Ser. No. 07/795,983 filed on Nov. 22, 1991, inventor: Nobuo IIZUKA; and U.S. Ser. No. 07/807,053 filed on Dec. 12, 1991, inventor: Nobuo IIZUKA.

In reproducing audio data stored on an external memory medium such as hard disk or magneto-optical disk, one part of an audio signal is stored on one track of the external memory medium. In case that the one part should include a continuous soundless portion (a continuous silent portion), such technical solution has been proposed for efficient use of the track that another part is stored on the track where the soundless portion was stored.

When a plurality of different parts of audio signals are stored on one and the same track and only required parts are reproduced from among a plurality of the previously recorded parts of audio signals, a user is required to operate a mixing machine for muting and erasing parts other than the required parts of the audio signals. However, the operation of the mixing machine for muting and erasing the above parts needs troublesome work, and further it is difficult for reproducing only the required parts to execute this muting operation precisely on time. In addition, if a computer provided in the mixing machine or connected thereto is employed for controlling the mixing machine, various control signals shall be supplied from a digital recorder to the mixing machine, which will invite complex control operation and will be obstacles to a small sized apparatus.

SUMMARY OF THE INVENTION

The present invention has been made to solve these problems, and has an object to provide a digital recorder which requires no muting operation to be executed manually by a user to reproduce only required parts of audio signals, even though a plurality of different parts of the audio signals are stored on one and the same track.

According to one aspect of the present invention, there is provided a digital recorder which comprises:

audio memory medium means for storing digital audio data;

a plurality of audio output channel means for executing output operation of an audio signal involved in the digital audio data stored in said audio memory medium means;

event table memory means for storing an event table which includes event identifying index data for identifying events and memory location data representing locations where events are stored, said digital audio data stored in said audio memory means being divided into a plurality of sectioned data, each of which forms an event;

control track memory means for storing a control track on which the event identifying index data included in said event table are stored in order of reproduction of the events, and channel identifying index data for designating one of the audio output channels are assigned to respective events; and channel identifying means for supplying an audio signal to the audio output channel means which is selected from among said plurality of audio output channel means in accordance with the channel identifying index data included in the control track, said audio signal being involved in the digital audio data of the relevant event supplied from said audio memory medium means.

In the above mentioned structure of the digital recorder, if a common channel identifying index data is assigned to a plurality of events of audio signals on the control track, the audio signals of these events with the common channel identifying index data can be output through the same audio output channel means. Meanwhile, if different channel identifying index data are assigned to a plurality of events, the audio signals of these events will be output through the separate audio output channel means, respectively.

According to one preferred aspect of the invention, as the audio memory medium means may be employed a disk memory medium of a random access type such as a hard disk and a magneto-optical disk.

Further, with use of the audio memory medium means which stores a plurality of tracks of audio signals, it may be possible to divide the audio signal on each track into a plurality of events and to supply these events to designated audio output channels respectively.

More specifically, there is provided a digital recorder which comprises:

audio input/output means for executing input/output operation of audio signals in association with a plurality of tracks;

buffer means capable of exchanging digital audio data of each track with said audio input/output means, and further capable of temporarily storing the digital audio data in association with each track;

audio memory means of a random access type capable of exchanging the digital audio data with said buffer means and having a memory area which stores digital audio data for multiple tracks, and is accessible for read/write operation of the digital audio data; and output means for executing output operation for selectively outputting through multiple audio output channels the multiple tracks of audio signals supplied from said audio input/output means;

event table memory means for storing an event table which includes event identifying index data for identifying events and memory location data for specifying locations where the events are stored, said digital audio data stored in said audio memory means being divided into a plurality of sectioned data, each of which forms an event;

control track memory means for storing a control track on which the event identifying index data included in said event table are stored in order of reproduction of the events, and channel identifying index data for designating one of the audio output channels are assigned to respective events;

channel control means for supplying an audio signal to the audio output channel which is selected from among said multiple audio output channels in accordance with the channel identification data given to said control track, said audio signal being involved in the digital audio data of a relevant event supplied from said audio memory medium means, and data transfer means for executing transfer of the digital audio data for each track between said audio input/output means and said buffer means and transfer of the digital audio data for each track between said buffer means and said audio memory means, in a time sharing manner while scheduling in accordance with predetermined order of priority.

In the above arrangement of the digital recorder, if events included in one part of the audio signal are assigned on the control track with a common channel identifying index data, these events with the common channel identifying index data are reproduced through the same audio output channel. Therefore, to reproduce only the events of a required part no manual muting operation is required for muting events of the other parts than the required parts.

According to another aspect of the present invention, there is provided a digital recorder which comprises:

audio input means for executing an input operation of audio data;

a plurality of audio output channel means for executing an output operation for outputting audio signals;

audio data memory means for storing digital audio data supplied from said audio input means;

event address memory means for storing an event address table which includes event identifying index data for identifying events and memory location data for specifying locations where the events are stored, said audio data stored in said audio data memory means being divided into a plurality of sectioned data, each of which forms an event;

control track memory means for storing a control track on which the event identifying index data included in said event address table are disposed in order of reproduction of the events, and channel identifying index data for designating one of the audio output channel means are assigned to respective events; and channel selecting means for supplying a corresponding event to the audio output channel means selected from among said multiple audio output channel means in accordance with the channel identifying index data included in said control track.

In the digital recorder of the above structure, the control track is referred to in order to confirm the order of arrangement of the events on a time axis for each track, and the event address table is read in this order to generate memory addresses of the events to be reproduced in order of reproduction, whereby the events to be reproduced are output from the audio data memory means in order of reproduction. When the control track is referred, the channel identification data for each event are read out and selection data corresponding to the channel identifying index data are supplied to the channel selecting means. Then, the channel selecting means selects the audio output channel means designated by the selection data, and outputs the events corresponding to the designated audio output channel means. Therefore, since the common channel identifying index data assigned on the control track to events included in one part of an audio signal will allow the events included in the one part and assigned with the common channel identifying index data to be reproduced through the common audio output channel, no manual muting operation is required for muting events included in other part in order to reproduce the events included in the required part.

According to yet another aspect of the invention, there is provided a digital recorder which comprises:

a plurality of audio input means for executing an input operation of audio signals in association with a plurality of tracks;

a plurality of audio output channel means for executing an output operation for outputting audio signals;

audio data memory means having a memory area for storing digital audio data for a plurality of tracks supplied from said audio input means;

event address table memory means for storing an event address table which includes event identifying index for identifying events and memory location data for specifying locations where the events are stored, said audio data stored in said audio data memory means being divided into a plurality of sectioned data, each of which forms an event;

control track memory means for storing a control track on which the event identifying index data included in said event address table are disposed in order of reproduction of the events, and channel identifying index data for designating one of the audio output channel means are assigned to respective events, and channel selecting means for supplying a corresponding event to the audio output channel means selected from among said plurality of audio output channel means in accordance with the channel identifying index data included in said control track.

In the digital recorder of the above structure, the control track is referred to in order to confirm the order of arrangement of the events on a time axis for each track, and the event address table is read out in accordance with the order of arrangement of the events, whereby the memory addresses of the events to be reproduced for each track are generated in order of reproduction. Then, the events for each track to be reproduced are output from the audio memory means in an order of reproduction. When the control track is referred to, the channel identifying index data for each event on individual tracks are read out, and election data corresponding to the channel identifying index data are supplied to the corresponding channel selecting means. Then, the channel selecting means for respective tracks selects the audio output channel means designated by the selection data, and outputs the relevant events to the selected audio output channel means. Therefore, a common channel identifying index data on the control track for controlling a plurality of tracks, which are assigned to events included in one part allows the events included in the same part and assigned with the common channel identifying index data to be reproduced through the same audio output channel means. No manual muting operation is required for muting events included in other parts in order to reproduce only the events included in the required part.

According to still another aspect of the invention, there is provided a digital recorder which comprises:

audio input means for executing an input operation for inputting audio data;

a plurality of audio output channel means for executing an output operation for outputting audio signal;

audio data memory means for storing digital audio data supplied from said audio input means;

event address table memory means for storing an event address table which includes event identifying index data for identifying events and memory location data for specifying locations where the events are stored, said audio data stored in said audio data memory means being divided into a plurality of sectioned data, each of which forms an event;

track schedule memory means for storing a track schedule in which a time is stored for starting reproduction of each event to be reproduced, and the respective events are assigned with channel identifying index data for designating one of the plurality of output channels; and channel selecting means for supplying events corresponding to the audio output channel means which is selected from among the plurality of audio output channel means in accordance with the channel identifying index data assigned to the events in the track schedule.

In the digital recorder of the above structure, when the track schedule is referred to and the event address table is read at times when events to be reproduced are reproduced, memory addresses of events to be reproduced are generated, whereby events are output from the audio data memory means at times when they are to be reproduced. Further, channel identifying index data for respective events are read out when the track schedule is referred to, and selection data corresponding to the read out channel identifying index data are supplied to the corresponding channel selecting means, respectively. Then, the channel selecting means of respective tracks select audio output channel means designated by the selection data, and output the events corresponding to the audio output channel means. Therefore, if a common channel identifying index data is assigned on the track schedule to events included in one part of an audio signal, the events included in the one part of the audio signal and assigned with the common channel identifying index data are reproduced through the same audio output channel means. As a result, no manual muting operation will be needed for muting events included in other parts of the audio signal in order to reproduce only the events included in the required part.

It would be apparent for those skilled in the art from the following description of preferred embodiments that the present invention may be therefore modified or changed in various different manners as well as applied to other cases.

BRIEF DESCRIPTION OF THE DRAWINGS

Other objects and structures of the present invention will be more fully understood by those skilled in the art from the following description of the preferred embodiments and the accompanying drawings.

FIG. 14 is a view showing an example of an event track schedule (hereafter referred to as ETS);

FIG. 15 is a view showing an example of an event address table (hereafter referred to as EAT); and FIG. 16 is a view showing an example of a reproduction schedule table.

DETAILED DESCRIPTION OF THE PREFERRED EMBODIMENTS

Figure 1:
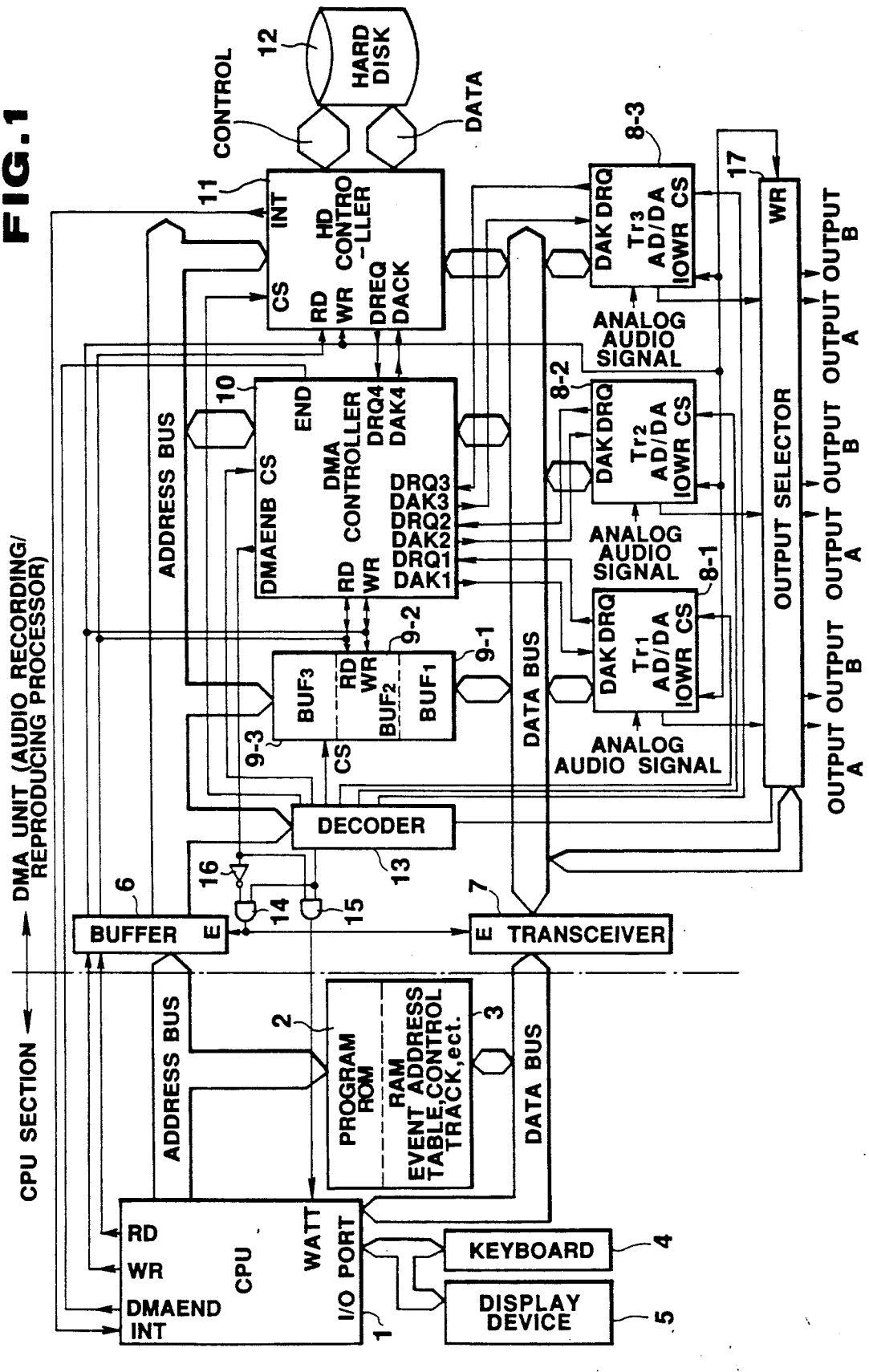
FIG. 1 is a block diagram showing a whole structure of an embodiment of a digital recorder of the present invention.

Now, preferred embodiments of the digital recorder according to the present invention will be described referring to the drawings.

General Structure

FIG. 1 is a view showing the whole structure of the embodiment of the digital recorder according to the present invention, which is designed to be capable of executing simultaneously recording operation and reproducing operation on up to three tracks. The structure is divided into a CPU section (a left side portion in FIG. 1) and a DMA unit (audio recording/reproducing processor, (a right side portion in FIG. 1) as shown in FIG. 1.

The CPU section comprises a CPU 1, a program ROM 2, a RAM 3, a keyboard 4 and a display device 5. The program ROM 2 stores a program (as will be described in detail later) for specifying operation of the CPU 1. The RAM 3 includes memory areas for storing various data, disk access pointers of three tracks, an event address table (refer to FIG. 15), event control tracks (refer to FIG. 13) and event track schedules (refer to FIG. 14), respectively, and a working area. When audio data stored on a hard disk 12 is divided manually or automatically into a plurality of sectional audio data (hereafter, each referred to as an "event"), event identifying index data (Event Nos.) and address of locations (including original Track Nos, Starting points and Ending points) where the events are stored on the event address table. The event identifying index data included in the event address table are disposed on each event control track in order of reproduction and channel identifying index data for designating one of the plurality of channels (A or B) are assigned to the respective events on the tracks. In the event track schedule are included reproducing times when the respective events are to be reproduced as well as the channel identifying index data which designates one of output channels (A or B) for the respective events. The keyboard 4 is connected as a peripheral device to an I/O port of the CPU 1 and has various function keys and data input keys. The display device 5 includes a cathode ray tube (CRT) or a liquid crystal display (LCD) and its driver for providing various displays.

As will be described later, in the real time operation such as in the recording/reproducing operation, the CPU 1 controls individual components in the DMA unit as needed while an address bus and a data bus in the DMA unit are not busy. In editing an audio signal, the CPU 1 rearranges data blocks and manipulates the disk access pointer. Setting a record /play mode for each track (hereafter referred to as Tr), starting and stopping the mode, locating the track and designating an editing point can be effected using the keyboard 4, as will be described later. An address signal is sent from the CPU 1 through the address bus to address terminals of the program ROM 2 and RAM 3, which have their output terminals connected through the data bus to CPU 1 or a transceiver 7.

A buffer 6 and the transceiver 7 are provided in the DMA unit to connect the CPU section to the DMA unit. The buffer 6 is connected through the address bus the CPU 1 to DMA unit, and is connected to an address bus in the DMA unit. The transceiver 7 is connected o through the data bus to the CPU 1, and is also connected to a data bus in the DMA unit.

In the DMA unit are provided an audio input/output device 8-1 for Tr1, an audio input/output device 8-2 for Tr 2 and an audio input/output device 8-3 for Tr3, which will independently receive or output an analog audio signal.

The audio input/output devices 8-1 to 8-3 each include a converter for selectively executing A/D conversion and D/A conversion, a low pass filter for eliminating sampling noises and a clock circuit for generating a clock signal of a sampling signal. When the mentioned tracks for the respective audio input/output devices 8-1 to 8-3 are set in a recording mode, each audio input/output device samples an externally supplied analog audio signal at the sampling cycle, and executes A/D conversion on the sampled signal to obtain digital audio data. When these tracks are set in a playing mode, the digital audio data which has been read out in advance is subjected to D/A conversion at the sampling cycle, and is then properly filtered to be output as an analog audio signal.

The audio input/output devices 8-1 to 8-3 for the respective tracks Tr1 to Tr3 are connected through their audio data output terminals to audio data input terminals of an output selector 17, respectively. The output selector 17 is provided with two audio output terminals for each of the tracks Tr1 to Tr3, one of which audio output terminals is connected to an output channel A and the other of which is connected to an output channel B. The output selector 17 is connected through its control input terminal, a transceiver 7 and data bus to the CPU 1 and a decoder 13. When the CPU 1 refers the track schedule shown in FIG. 14, it reads out channel identifying index data (A or B) of events to be reproduced, and supplies selection data corresponding to the channel identifying index data through the transceiver to the control input terminal of the output selector 17. When the CPU 1 supplies selection data to the output selector 17, it supplies a signal WR designating the play mode through the decoder 13 to the output selector 17. The output selector 17 selects for each track the output channel A or B designated by the selection data supplied from the CPU 1, and supplies them with corresponding events output from the audio input/output devices 8-1 to 8-3. The detailed structure of the output selector 17 will be described later referring to FIG. 3.

The audio input/output devices 8-1 to 8-3 for the respective Tr1 to Tr3 are connected through the data bus to buffers 9-1 (BUF 1), 9-2 (BUF 2) and 9-3 (BUF 3), respectively, exchanging digital audio data therewith.

The buffers 9-1 to 9-3 correspond to Tr1 to Tr3, respectively, and exchange data respectively with the audio input/output devices 8-1 to 8-3 through direct memory access under control of a DMA controller 10.

In the recording mode, the audio input/output devices 8-1 to 8-3 request the DMA controller 10 for DMA transfer (single transfer) of digital data in association with one sampling from the audio input/output devices 8-1 to 8-3 to the buffers 9-1 to 9-3 at the sampling cycle. That is, the audio input/output devices 8-1 to 8-3 send DRQ signals (signal DRQ 1 for Tr1, DRQ 2 for Tr 2 and DRQ 3 for Tr3) to the DMA controller 10, and then the DMA controller sends back acknowledgement signals (signal DAK 1 for Tr1, DAK 2 for Tr 2 and DAK 3 for Tr3) to the devices 8-1, 8-2 and 8-3, executing actually the data transfer.

In the playing mode, the audio input/output devices 8-1 to 8-3 request the DMA transfer (single transfer) of the digital data in association with one sampling at the sampling cycle from the buffers 9-1 to 9-3 to the audio input/output devices 8-1 to 8-3, and the DMA controller 10 executes the data transfer as described above.

The buffers 9-1 to 9-3 each have memory capacity sufficient for storing digital audio data for multiple times. That is, the buffers 9-1 to 9-3 comprise memory areas in RAM which are prepared for Tr1 to Tr3 respectively, and these buffers are arranged to function as FIFO buffers, when they are used as ring buffers (a buffer whose last address and first address are imaginarily linked together).

The buffers 9-1 to 9-3 are addressed through address bus by the DMA controller 10. The address bus, the data bus and a control signal line within the DMA unit are occupied by the DMA controller 10, while the DMA transfer is being executed.

The buffers 9-1 to 9-3 exchange data through the data bus with the hard disk 12 under control of a hard disk controller (hereafter referred to as HD controller). The hard disk 12 and the HD controller 11 are connected to each other through the data bus and the control signal line. The hard disk 12 are accessed for read/write operation under control of the HD controller 11. The hard disk 12 has three separate memory areas which are prepared for three tracks Tr1 to Tr3 respectively. Data transfer between the hard disk 12 and the buffers 9-1 to 9-3 is executed under control of the DMA controller 10. The HD controller 11 serves to execute the data transfer by sending an interrupt signal (INT) to the CPU 1 after the HD controller 11 has transferred one data block, and sending a command for transferring the following data. Upon receiving the interrupt signal INT from the HD controller 11, the CPU 1 sets the DMA controller 10, the HD controller 11 to a desired mode or effect programming thereof, and then allows the controllers to execute the DMA transfer (block transfer). This operation will be described in detail later.

In the playing mode, reading out previously determined amount (data for multiple sampling cycle) of digital audio data from the hard disk 12, the DMA controller 10 executes the DMA transfer (block transfer) of the digital audio data to the designated buffer among the buffers 9-1 to 9-3. In the recording mode, the DMA controller 10 reads out the predetermined amount (data for multiple sampling cycles) of digital audio data from the designated buffer among the buffers 9-1 to 9-3, and executes the DMA transfer (block transfer) of the data to a designated location on the hard disk 12.

For exchanging data between the hard disk 12 and the buffers 9-1 to 9-3, the HD controller 11 sends a request signal DREQ to the DMA controller 10 (the DMA controller 11 receives the request signal as DRQ 4), and the DMA controller 10 sends back a response signal DACK to the HD controller 11 when the data transfer is made ready.

As described above, the DMA controller 10 executes the data transfer on four channels in the time sharing manner: the data transfer on three channels (CH1 to CH3, to be described later) between the audio input-/output devices 8-1 to 8-3 for Tr1 to Tr3 and the buffers 9-1 to 9-3 and the data transfer on one channel (CH4, to be described later) between the hard disk 12 and any one of the buffer which is selected sequentially from the buffers 9-1 to 9-3.

The CPU 1 supplies an address signal through the address bus to the buffer 6 to control functions or operation of individual components within the DMA unit, and also supplies designating signals for designating the components through the buffer 6 to the decoder 13, then sending the designating signals CS to the audio input/output devices 8-1 to 8-3, the buffers 9-1 to 9-3, the DMA controller 10 and the HD controller 11. At the same time, the CPU 1 exchanges data with these circuits via the data bus through the transceiver 7.

Further, the CPU 1 supplies IOWR terminals of the respective audio input/output devices 8-1 to 8-3 through the buffer 6 with the designating signal WR which designates if the audio input/output devices 8-1 to 8-3 should be set to the recording mode (write mode) or the playing mode (read mode).

The CPU 1 also sends the designating signal (write signal) WR and another designating signal (read signal) RD through the buffer 6 to the buffers 9-1 to 9-3, the DMA controller 10 and the HD controller 11, for reading out data from and writing data in the respective components. The DMA controller 10 also outputs the designating signals RD and WD in DMA transfer mode. The relationship between these signals and the functions and operation of these components will be described in detail later.

The DMA controller 10 sets a DMA enabling signal DMAENB to "1" and outputs it while the DMA transfer is being executed between the components within the DMA unit. When the signal DMAENB is sent to an AND gate 14 through an invertor 16, the output of the AND gate 14 becomes "0". Then the enabling signal E is supplied as "0" to the buffer 6 and the transceiver 7 to disable the CPU section and the DMA unit to exchange data and address transfer with each other. If a signal of "1" is supplied to an AND gate 15 from the decoder 13 in this case, the output of the AND gate 15 becomes "1", allowing a wait signal WAIT to be supplied to the CPU 1.

If the DMA transfer start while the CPU 1 supplies the decoder 13 with a predetermined signal to enable the buffer 6 and the transceiver 7 in order to control the DMA unit, that is, while the decoder 13 supplies a signal of "1" to an input terminal of the AND gate 14 (when the CPU 1 outputs the address signal to access any one of the buffers 9-1 to 9-3, the DMA controller 10, the HD controller 11 and the audio input/ output devices 8-1 to 8-3, the output of the decoder 13 becomes active, sending the signal of "1" to an input terminal of each of the AND gates 14 and 15), the CPU 1 receives a wait signal WAIT, allowing the DMA transfer to be executed by priority over other operation. After the DMA transfer is completed, the CPU 1 is released from WAIT, starting the operation again.

Even if the CPU 1 tries to access the DMA controller 10 while the DMA controller 10 is executing the DMA transfer, the wait signal WAIT is supplied from the AND gate 15 to the CPU 1, and the execution cycle of the CPU 1 is made longer to disable the buffer 6 and the transceiver 7 during this period.

In short, the CPU 1 is allowed to access the components within the DMA unit under the following conditions:

(1) when the CPU 1 outputs address to access the individual components within the DMA unit, and (2) when the signal DMAENB is inactive ("0"), that is, the data bus within the DMA unit is not busy.

The CPU 1, however, is allow to proceed processing by action of the AND gates 14 and 15 without considering when to access the DMA unit.

To immediately change the operating state of the DMA unit in response to a trigger of the control data or a key input, the CPU 1 is allowed to output the command DMAEND to the DMA controller 10 to interrupt the DMA transfer whatever state the DMA controller 10 is in (the command is supplied as an END signal to the DMA controller 10).

Structure of Essential Portions of the DMA Controller 10

One example of the structure of the DMA controller 10 will now be described. The DMA controller 10 can transfer in one bus cycle of several hundreds nanoseconds. Therefore, it will take one to two microseconds to transfer the sampling data for three tracks.

When a sampling frequency fs is set to 48 KHz, the interval of one sampling period will be approximately 21 microseconds. It is possible to assign most of the sampling time interval to the time for transferring data among the buffers 9-1 to 9-3, the HD controller 11 and the hard disk 12, and the time for CPU 1 to program the individual components.

Figure 2:
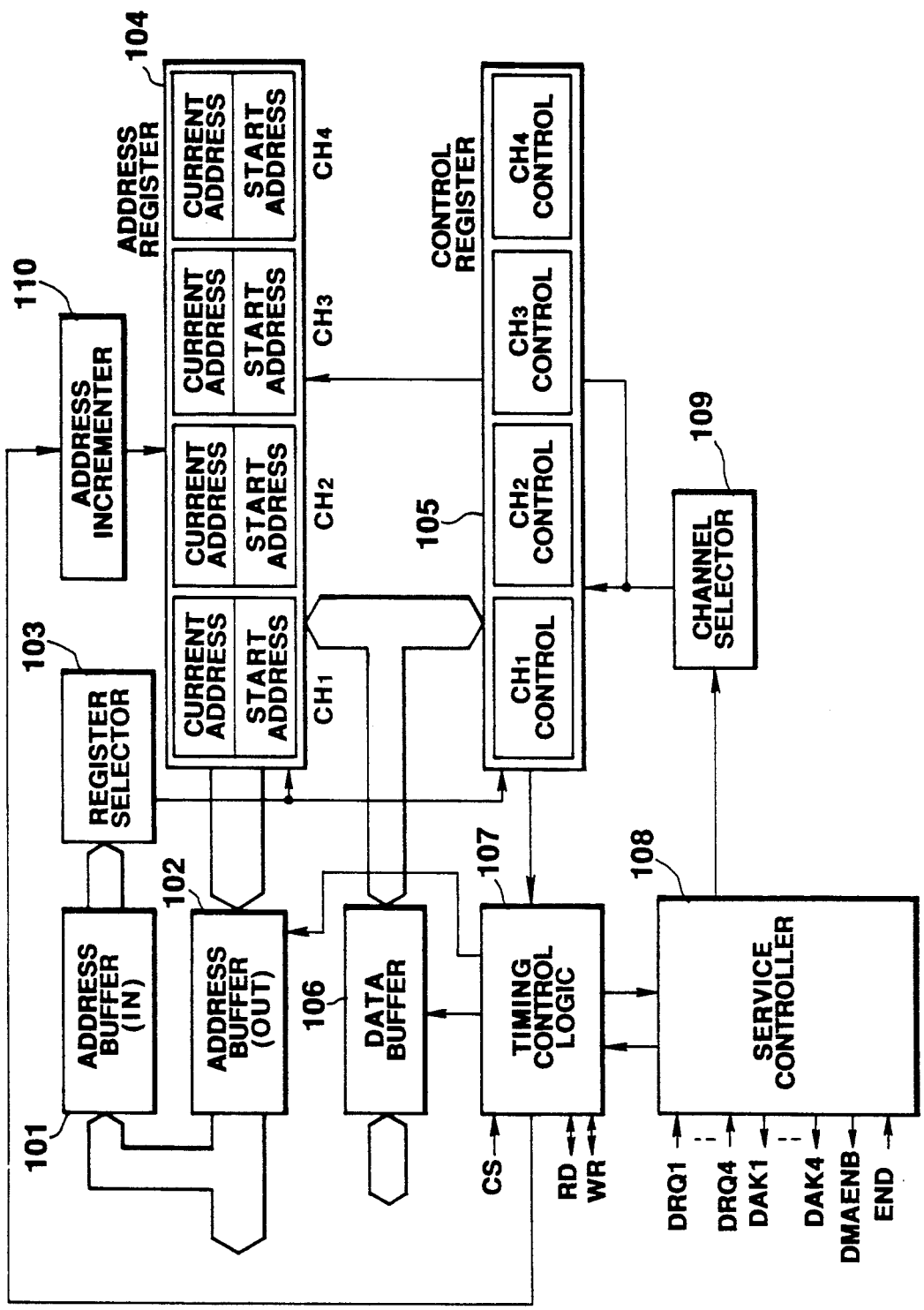
FIG. 2 is a block diagram showing a specified embodiment of an essential part of a direct memory access controller (hereafter referred to as DMA controller) of FIG. 1.

The structure of the essential portions of the embodiment is shown in FIG. 2. The DMA controller 10 has an address buffer 101 on its input side (IN) to be connected to the address bus and an address buffer 102 at its output side (OUT). In accordance with the address signal supplied to the address buffer 101 on the input side, what is designated by the a register selector 103 is changed to designate desired registers present in an address register 104 and a control register 105.

The address register 104 and the control register 105 each have areas for four channels CH1 to CH 4. The channels CH1 to CH3 are registers for executing the DMA transfer between the buffers 9-1 to 9-3 and the audio input/output devices 8-1 to 8-3, and the channel CH4 is a register for executing the DMA transfer between the hard disk 12 and the designated buffer among the buffers 9-1 to 9-3.

The registers for the channels CH1 to CH4 in the address register 104 each have a memory area for storing at least current addresses and start addresses of the corresponding buffer 9-1, 9-2 or 9-3 and a designated buffer. The individual areas for channels CH1 to CH4 in the control register 105 store control data for designating the direction of DMA transfer.

The contents of the address register 104 and the control register 105 are allowed to be input from and output to the data bus through a data buffer 106. A timing control logic 107, a service controller 108 and a channel selector 109 control these components.

The service controller 108 is of a hard logic type for of a micro program control type. The service controller 108 receives a signal from the timing control logic 107, the DMA request signals DRQ1 to DRQ4 from the audio input/output devices 8-1 to 8-3 and the HD controller 11 and a DMA interrupt command (DMAEND) from the CPU 1, and outputs response (acknowledge) signals DAK 1 to DAK 4 to the above components and a DMA enabling signal DMAENB indicating that DMA transfer is on. Further, the controller 108 outputs various commands to the timing control logic 107, and a channel selecting signal to the channel selector 109. The channel selector 109 selectively designates registers corresponding to the individual channels CH1 to CH4 in the control register 105.

The timing control logic 107 receives a designating signal CS from the decoder 13, a control signal from the control register 105 and a control signal from the service controller 108, controlling input/output operation of the address buffer 102 and the data buffer 106. Further, the timing control logic 107 enables an address incrementer 110 to increment the current address register of the designated channel in the address register 104.

Structure of the Output Selector 17

Figure 3:
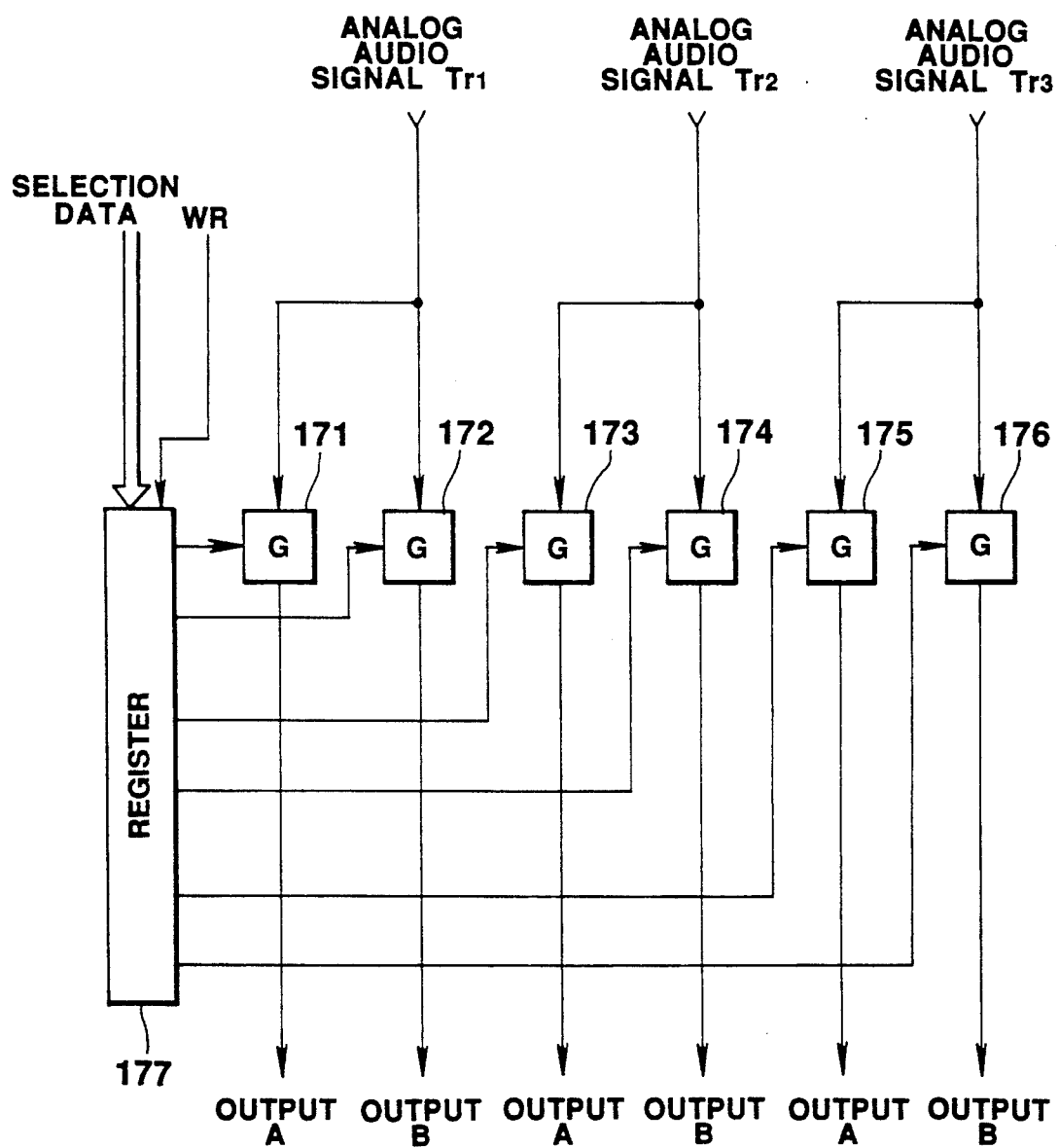
FIG. 3 is a block diagram showing a structure of an output selector 17 of FIG. 1.

FIG. 3 is a view showing the structure of an embodiment of the output selector 17 of FIG. 1. Inputs of gates 171 and 172 receive an analog audio signal output from the audio input/output device 8-1 corresponding to the track Tr1. Outputs of the gates 171 and 172 are connected respectively to the output channels A and B corresponding to the track Tr1. Inputs of gates 173 and 174 receive an analog audio signal output from the audio input/output device 8-2 corresponding to the track Tr2. Outputs of the gates 173 and 174 are connected respectively to the output channels A and B corresponding to the track Tr2. Inputs of gates 175 and 176 receive an analog audio signal output from the audio input/output device 8-3 corresponding to the track Tr3. Outputs of the gates 175 and 176 are connected respectively to the output channels A and B corresponding to the track Tr3.

On/off control inputs of the gates 171 to 176 receive the zeroth to fifth bit output of a register 177, respectively. Receiving a signal of "1" at their on/off control inputs, the gates 171 to 176 are turned on, allowing the audio signals input thereto to be transferred to the output channels while receiving a signal of "0" at their on/off control inputs, the gates are turned off, disabling the audio signal supplied thereto from being transferred to the output channels.

Referring to the event track schedule of Fig. 14 stored in the RAM 3 to confirm times for reproducing events of the respective tracks, the CPU 1 reads out the channel identifying index data (A or B, or A and B) for respective events of each track and outputs selection data corresponding to the channel identifying index data to the register 177. At this time, the CPU 1 also outputs the signal WR for designating the playing mode. If the output channels selected for reproducing events on the tracks TR1, Tr2 and Tr3 are A, A and B respectively, the CPU 1 selection data "1", "0", "1", "0", "0" and "1" to the zeroth bit position through the fifth bit position of the register 177, respectively. Then, the gates 171 and 173 allow the corresponding events to pass to the output channels A of the tracks Tr1 and Tr2, and the gate 176 allows the corresponding events to pass to the output channel B of the track Tr3. If the channel identifying index data sets such that the events be output both to the channels A and B for the track Tr1, it will be apparent that the bits corresponding to the gates 171 and 172 of the register 177 are "1" and "1".

Whole Operation of CPU 1

Figure 4:
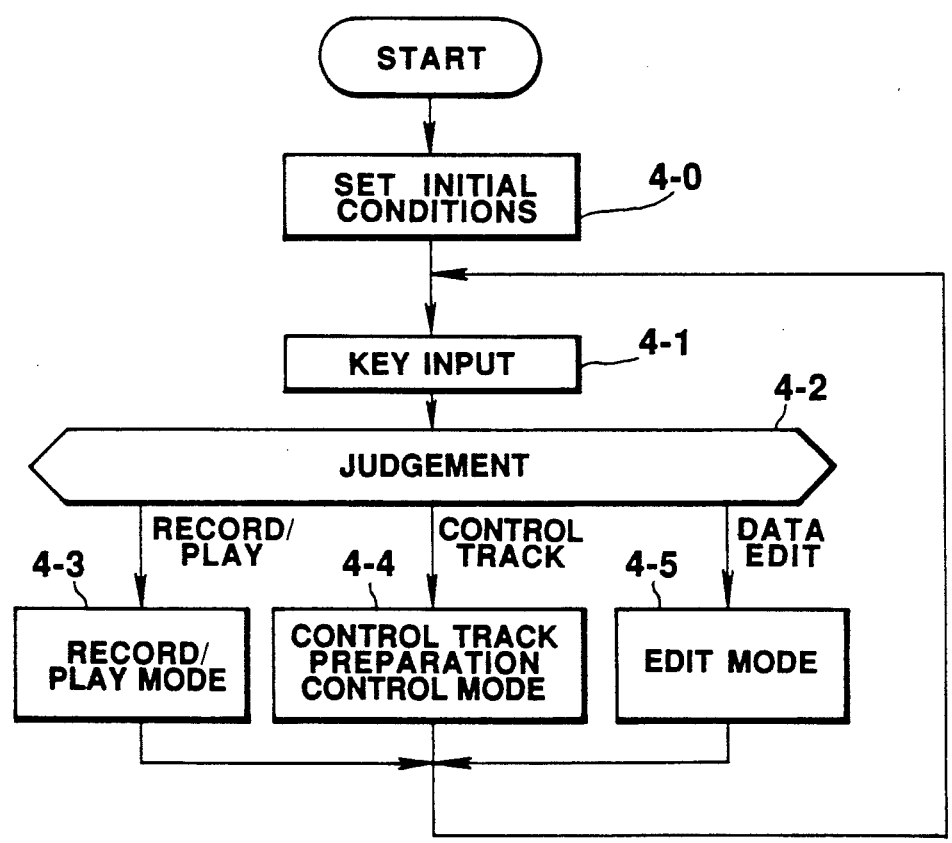
FIG. 4 is a flowchart showing main routine operation of a central processing unit (hereafter referred to as CPU) of FIG. 1.
Figure 5:
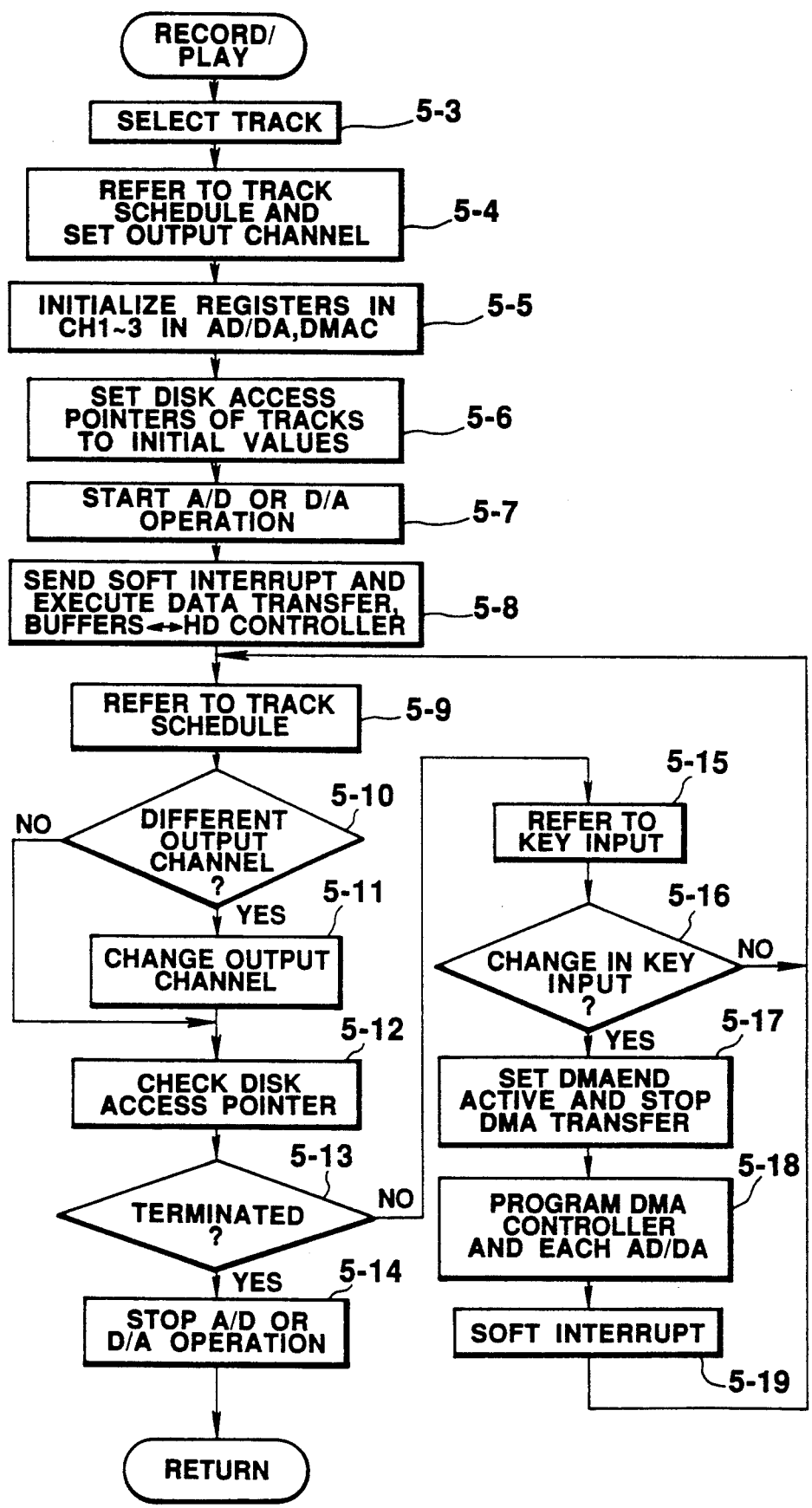
FIG. 5 is a detailed flowchart showing recording/reproducing operation of the CPU 1 of FIG. 1.
Figure 6:
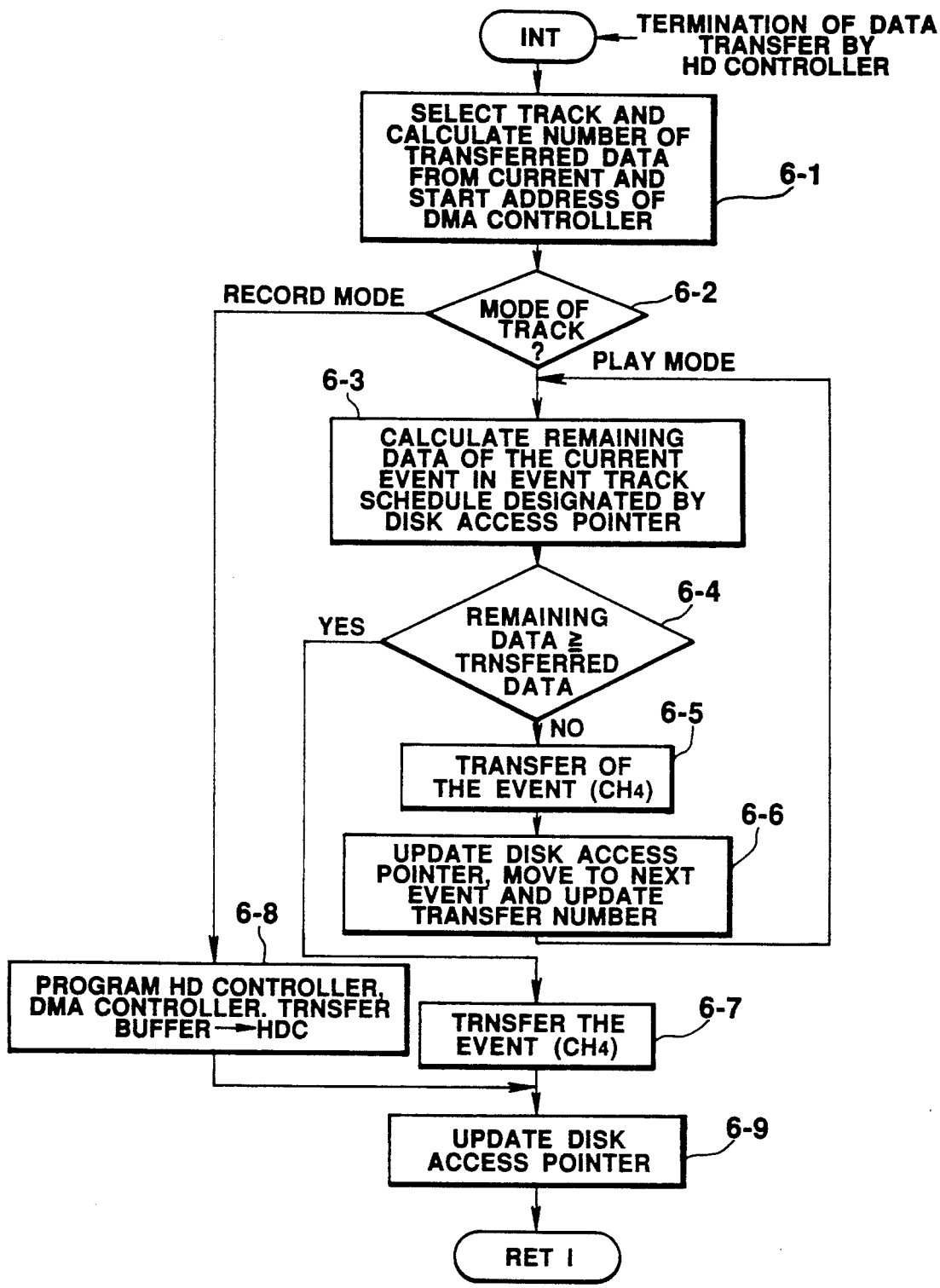
FIG. 6 is a flow chart showing interrupt routine operation of CPU 1 of FIG. 1.

Now, the operation of the embodiment will be described hereafter. Flowcharts showing the operation of the CPU 1 are shown in FIGS. 4, 5 and 6. The CPU 1 works in accordance with a program (software) stored in the program ROM 2. FIG. 4 is a flowchart of the main routine operation of the CPU 1, FIG. 5 is a flowchart of a recording/reproducing routine operation and FIG. 6 is a flowchart of an interrupt routine operation executed by the CPU 1 when it receives the interrupt signal INT from the HD controller 11.

In FIG. 4, the CPU 1 starts the main routine operation in response to a power on operation. The CPU 1 sets various initial conditions at step 4-0. Receiving a key input at step 4-1, the CPU 1 judges at step 4-2 what mode has been set.

Figure 10:
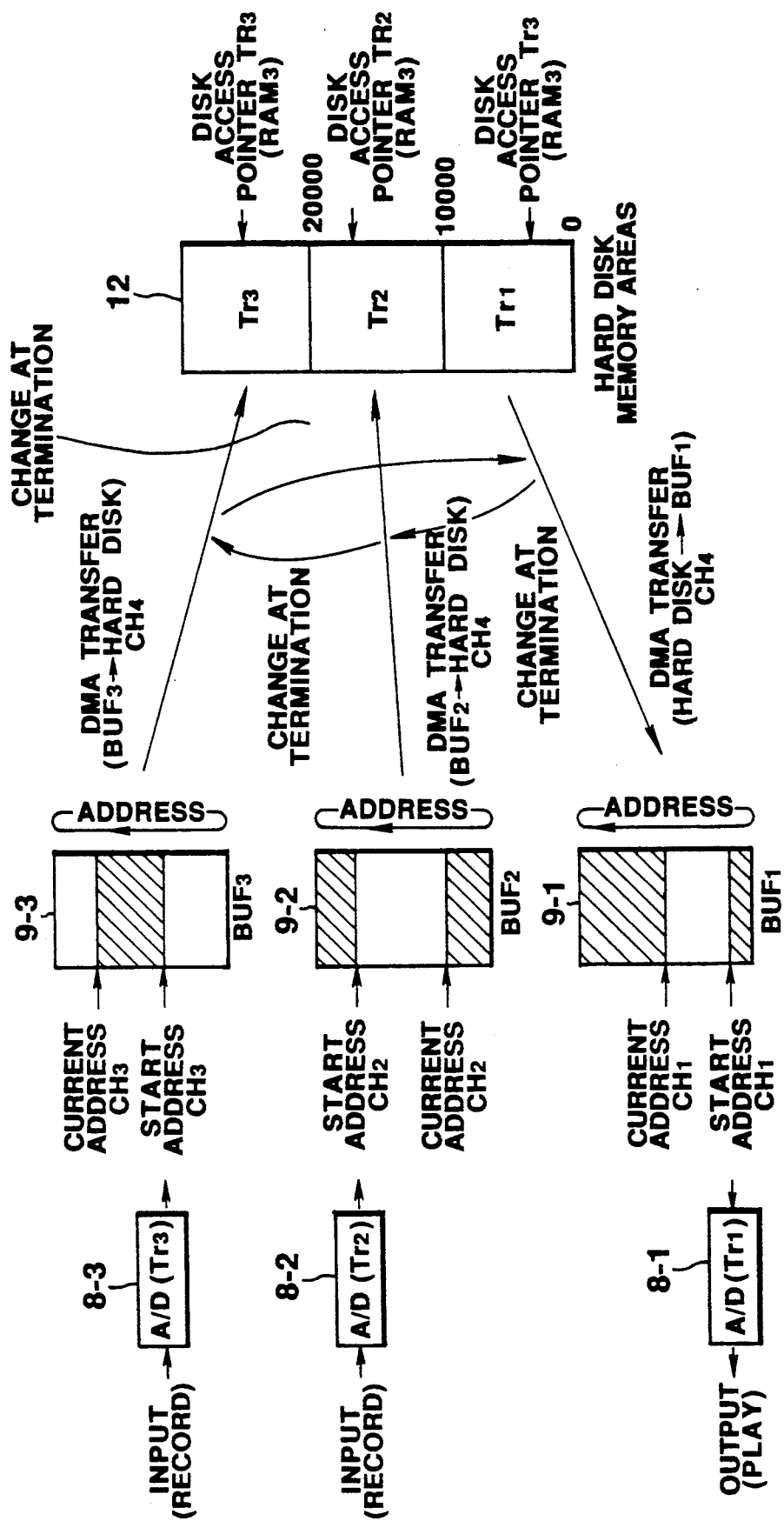
FIG. 10 is a view showing concept of whole operation of the digital recorder of FIG. 1.

When the CPU 1 judges the recording/reproducing mode is set at present, the CPU 1 goes to step 5-3 of FIG. 5, where it sequentially selects and designates three tracks, and further advances to step 5-4, where it sets the operation modes for respective tracks in accordance with input instructions from a keyboard 4. The CPU 1 refers the event track schedule (ETS) of Fig. 14 stored in the RAM 3, and reads out an output channel identifying index data for the first event of each track. Since, in an example of FIG. 14, the first events for three tracks are assigned with the output channel A, the CPU 1 outputs selection data "1", "0", "1", "0", "1" and "0" to the zeroth to the fifth bit position of the register 177 of FIG. 3, respectively. Then the CPU 1 sequentially outputs at step 5-5 the designating signals CS through the buffer 6 and the decoder 13 to the audio input/output devices 8-1 to 8-3, supplying them with IOWR, and decides which operation of A/D conversion and D/A conversion the individual devices should execute. Now, we assume that the playing mode (where D/A conversion is to be executed) is set for the track Tr1, and the recording mode (where A/D conversion is to be executed) is set for the tracks Tr2 and Tr3. FIG. 10 is a view showing concept of whole operation of the recorder in which the operation mode have been set as described above.

The CPU 1 controls at step 5-5 the DMA controller 10 to initialize addresses of the buffers 9-1 to 9-3 of the tracks Tr1 to Tr3. More specifically, registers (address registers 104 and the control registers 105) for the respective channels CH1 to CH3 are designated by operation of the address buffer 101, the register selector 103 and the channel selector 109 of FIG. 2, and are supplied with initializing data through the data buffer 106 to be initialized.

The buffers 9-1 to 9-3 are arranged to be used circularly as ring buffers. At the initial condition, the start addresses and the current addresses of the buffers 9-1 to 9-3 are set to coincide to each other (the state is schematically shown in FIG. 10 in which the start addresses and the current addresses of the buffers 9-1 to 9-3 are stored in the address register 104 for CH1 to CH3 to be controlled).

Further, the CPU 1 executes processing of step 5-6, setting to initial values the disk access pointers corresponding to the respective tracks Tr1 to Tr3 present in a working areas in the RAM 3 (relationship between the memory areas in the hard disk 12 and the disk access pointers is shown in FIG. 10).

The CPU 1 causes at step 5-7 the audio input/output devices 8-1 to 8-3 to execute A/D conversion or D/A conversion on received data. At step 5-8, the CPU 1 issues a software interrupt, allowing the processing to be executed which is similar to the processing that is executed when the HD controller 11 sends a program request for data transfer between the hard disk 12 and one of the buffers 9-1 to 9-3 (that is, when the HD controller 11 sends the interrupt signal INT to the CPU 1), as will be described later.

More specifically, the CPU 1 performs at step 5-8 operation in accordance with the flowchart shown in Fig. 6. For example, the CPU 1 selects at step 6-1 the channel CH1 corresponding to the track Tr1 as the channel in DMA controller 10 to execute DMA transfer of the digital audio data, for example, of the event 1 from the hard disk 12 to the buffer 9-1. Reading out at step 6-1 a current address and a start address form the area of CH1 in the address register 104 of the DMA controller 10, the CPU 1 calculates a number of data to be transferred to the buffer 9-1 or from the buffer 9-1 (that is, in the recording mode, the number of data to be stored in the buffer 9-1 to the full extent or number of data to be transferred from the buffer 9-1, and in the playing mode, the number of data to be stored in the empty buffer 9-1 or number of data to be transferred to the buffer 9-1).

Then, the CPU 1 judges at step 6-2 whether the recording mode or the playing mode is set for the track (track Tr1). When the recording mode is set for the track, the CPU 1 programs the DMA controller 10 and the HD controller 11 and allows data transfer from the buffer 9-1 to the HD controller 10 to be executed at step 6-8. More specifically, the CPU 1 programs the DMA controller 10, by copying the start address of CH1 to the start address and the current address of CH4. The current address of CH4 is increased every time when a unit of data is transferred from the buffer 9-1 to the HD controller 11. Reading out the disk access pointer of the track Tr1 from the work area of the RAM 3, the CPU 1 programs the HD controller 11 from the read out pointer, number of data calculated at step 6-2 to be transferred from the buffer 9-1 to the HD controller 11, and the mode (the recording mode) detected at step 6-2.

As a result, the HD controller 11 makes a request (outputs DREQ) to the DMA controller 10 to execute the DMA transfer from the buffer 9-1 to the hard disk 12. The DMA controller 10 will execute the DMA transfer as requested. At step 6-9, the CPU 1 updates the disk access pointer of the Tr1 in the work area of the RAM 3 to a value which the pointer will take after execution of the above transfer. The DMA controller 10, from now on, executes all the data transfer between the buffer 9-1 and the hard disk 12. When the DMA transfer is completed, the CPU 1 sets the address of the hard disk to the disk access pointer of the Tr1.

When the CPU 1 judges that the playing mode is set for the Tr1, it calculates at step 6-3 number of data left for the present event in the event track schedule ETS to which the disk access pointer in the RAM 3 belongs. The event track schedules ETS are prepared for respective tracks, and determine a number a starting time of each event. Locations on the hard disk 12 where the individual events are to be stored are determined with reference to the event address table EAT (FIG. 15). Preparation of the event track schedule ETS and the event address table EAT will be described later.

The disk access pointer in the RAM 3 is not to indicate memory address, the audio data at which is being reproduced by the audio input/output device 8-1, 8-2 or 8-3 (8-1, in this instance), but to indicate the leading address of a data block stored on the hard disk 12 to be transferred. As described above, the disk access pointer comprises address data. If the disk access pointer of the Tr1 takes a value of 520, the event to which the pointer belongs is the event 1 in the instance of FIG. 14, and number of data left in the event 1 will be calculated from the table of FIG. 15 as follows:

$$799 - (520 - 1) = 280$$

At step 6-4, the number of the data left in the event 1, as calculated above is compared with the number of data which is calculated at step 6-1 to be transferred. If the latter is larger than the former, the data of the event 1 are transferred from the hard disk 12 to the buffer 9-1 at step 6-5. Assuming that the value of the disk access pointer is 520, the number of data remaining in the event 1 is 280, and the number of data which are allowed to be transferred is 500, then $280 < 500$ is true. Therefore, audio data stored at 280 addresses out of the addresses 520 on the hard disk 12 as indicated by the disk access pointer are transferred from the hard disk 12 to the buffer 9-1.

The CPU 1 programs the DMA controller 10 and the HD controller 11, allowing the data transfer to be executed from the hard disk 12 to the buffer 9-1. The CPU 1 programs the DMA controller 10, by copying the start address of CH1 to the start address and the current address of CH4. The current address of CH4 is increased every time when a unit of data is transferred from the HD controller 11 to the buffer 9-1. The CPU 1 programs the HD controller 11 from the value of the disk access pointer (520 in this instance), number of data left in the event address table (280 in this instance), as calculated at step 6-3, and the mode (the playing mode) detected at step 6-2.

As a result, the HD controller 11 makes a request (outputs DREQ) to the DMA controller 10 to execute the DMA transfer from the hard disk 12 to the buffer 9-1. The DMA controller 10 will execute the DMA transfer as requested. At step 6-6, the CPU 1 updates the disk access pointer of the Tr1 in the work area of the RAM 3 to a value which the pointer will take after execution of the above transfer. In the above instance (in FIG. 14), the disk access pointer is updated to 800, and the operation goes to the following element on the table (second element from the top in the event track schedule of FIG. 14). The number of data which are allowed to be transferred to the buffer 9-1 is also updated (to 220 in this instance).

The operation returns to step 6-3 of FIG. 6 again, where the CPU 1 calculates the number of data left in the present event to which the disk access pointer belongs, i.e., the number of data left in the event 12 of the event track schedule ETS (in this instance, data remaining in the event 12 are 400 since data are from 800 to 1199). Then, the number of the remaining data (400) is compared with the number (220) of data which are allowed to be transferred at step 6-4. In this case, since the former is larger than the latter, the operation goes from step 6-4 to step 6-7, where 220 units of data stored at addresses between 800 and 1020 are transferred. At step 6-9, the disk access pointer is updated to a value 1020, and the operation returns to the main routine operation of FIG. 5.

As will be apparent from the later description, when the first interrupt routine of FIG. 6 is executed, and the HD controller 11 is activated once, the HD controller 11 issues the interrupt (to send the INT signal to the CPU 1) every time when transfer of the data block designated by the CPU 1 is completed, so that the CPU 1 judges only if the record/play operation is terminated, if the key input is made, or if the trigger indicated in the control data is initiated.

When the first events on the three tracks (the events 1, 4 and 3 in the instance of FIG. 14) are selected and output from the hard disk 12 to the selected output channels (A, A and A in the instance of FIG. 14) through the buffers 9-1, 9-2 and 9-3, the audio input-/output devices 8-1, 8-2 and 8-3, and the gates of 171 to 176 of the output selector 17, the CPU 1 refers to the track schedule at step 5-9 to read out the channel identifying index data of the second events on the respective tracks. If the channel identifying index data of the second events are the same as those of the first events ("No" at step 5-10), the CPU 1 executes the processing at step 5-12 while the channel identifying index data of the second events are different from those of the first events ("Yes" at step 5-10), the CPU 1 executes the processing at step 5-11 to change the output channels before executing the processing at step 5-12.

Since, in the instance of FIG. 14, the second events on the three tracks are assigned with the output channels B, A and B respectively, the CPU 1 rewrites data at zeroth, first, fourth and fifth bit position of the register 177 to "0", "1", "0" and "0" respectively, whereby the gates 172, 173 and 176 will be turned on while the gates 171, 174 and 175 will be turned off.

More specifically, the CPU 1 refers to the disk access pointer (RAM 3) at step 5-12, and judges at step 5-13 whether or not the memory area is over or the recording/playing operation is terminated. When the result of the judgement at step 5-13 is "Yes" (i.e., when the memory area is over), the CPU 1 stops A/D conversion and D/A conversion in the audio input/output devices 8-1 to 8-3 at step 5-14, and returns to step 4-1 of FIG. 4. When the result of the above judgement is "No" (i.e., when the memory area is not over), the CPU 1 refers to the key input state at step 5-15. If no change has been found, the CPU 1 returns to step 5-9 to refer to the track schedule, and then repeatedly executes the processes at steps 5-9 to 5-16.

When there is some change found at step 5-16, the CPU 1 goes from step 5-16 to step 5-17, where the CPU 1 temporarily stops the DMA transfer and outputs the DMA end command (DMAEND) to the DMA controller 19 for new setting. Then, according to a new input command and the like, the CPU 1 programs the DMA controller 10 and the audio input/output devices 8-1 to 8-3 at step 5-18, and advances to step 5-19 to restart the DMA operation. The CPU 1 executes the interrupt routine operation of FIG. 6 as done at step 5-8, and then return to step 5-9.

In the playing/recording mode, after the initialization at steps 5-4 to 5-8, the CPU 1 repeatedly executes the processes at steps 5-9, 5-10, 5-11, 5-12, 5-13, 5-15, 5-16, 5-17, 5-18 and 5-19. In response to a change command from the keyboard 4 (e.g., a pause (stop of A/D or D/A conversion) or a punch in/out (switching between A/D or D/A conversion) or a change in the control data obtained in the editing mode, the CPU 1 immediately stops the DMA transfer control operation, changes the program, and then restarts the similar processing.

Judging at step 4-2 that a control track preparation control mode has been set, the CPU 1 advances from step 4-2 to step 4-4, where it prepares the event control track. Before preparation of this event control track, the CPU 1 modifies the audio data into event data. The modification of the audio data into event data means that the CPU 1 divides the audio data which is continuously disposed on a time axis into a plurality of sectioned audio data, and generates event numbers for identifying these sectioned audio data and data for (a start point and an end point) for representing a section of the sectioned audio data. These event numbers, start points and end points of the sectioned audio data are registered on the event address table (EAT) in the RAM 3. The start point and end point of the sectioned audio data correspond to an start address and end address of the event stored on the hard disk 12. An example of the event address table is shown in FIG. 15, as described above. A symbol "G" given in a column of attribute in the event address table of FIG. 15 means "grouping". For example, the event 5 represents a group of the events 12 and 13, and the events 14 and 15 are obtained by dividing the event 7.

After the audio data has been modified into event data, the event control track (ETC) is prepared. In the event control track (ETC), the event identifying index data (the event number) of the events included in the event address table (EAT) are disposed on respective tracks in order of reproduction of the events, and each of the event identifying index data carries channel identifying index data which designates one of the output channels. An example of such event control track (ETC) is shown in FIG. 13.

A description of processing for preparing the event control table will now be given. It is assumed that time is known in this processing. The CPU 1 indicates the time axis and the end point of the previous event En-1 on the display device 5. Then, an editor (a user) designates an input track, an input event, its start and end point, and an output channel through key operation of the keyboard 4. The CPU 1 compares the start point Sn of the input event designated by the key operation with the end point En-1 of the previous event. If the former is larger than the latter, the CPU 1 writes a time corresponding to the start point Sn of the input event and its event number in the event track schedule (ETS), and calculates the end point En of the input event from the event address table (EAT). If the start point Sn of the input event is smaller than the end point En-1 of the previous event or if the both are equivalent to each other, the CPU 1 waits for another input track, input event and its start point to be designated by the editor. The processing described above will be repeatedly executed for preparing the event control track (ECT) as well as the event track schedule (ETS) until the editor inputs an end command through the key board 4.

Figure 13:
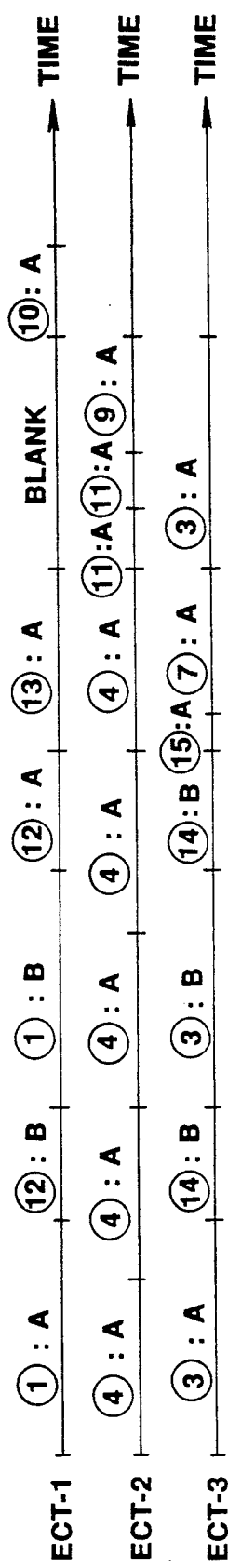
FIG. 13 is a view showing an example of an event control track (hereafter referred to as ECT)

FIG. 13 is a view showing an example of the event control track prepared as described above. In FIG. 13, ECT-1, ECT-2 and ECT-3 correspond to the tracks Tr1, Tr2 and Tr3, respectively.

FIG. 14 is a view showing an example of the event track schedule ETS prepared in the ECT processing. The event track schedule includes times for starting reproduction of the individual events and the channel identifying index data of respective events for designating one of the plurality of output channels. The event track schedule is stored in the RAM 3.

Upon detection of the termination of the control track preparation control mode, the CPU 1 checks the key input at step 4-1 again.

When the CPU 1 judges at step 4-2 that the editing mode (EDIT) has been set, it advances from step 4-2 to step 4-5. At step 4-5, the CPU 1 judges which tracks or which points should be edited or how they should be edited (for example, a timing of generation of a sound recorded at a determined time point is shifted before or after, or modified, and the sound is eliminated), and performs various editing operations. Though not described in detail, editing operations are performed under control of the CPU 1, such as programming of the HD controller 11 and the DMA controller 10 with respect to access points for reading out data from the hard disk 12, data transfer to the RAM 3, various compilation of data using the RAM 3, operation of restoring the digital audio data to the hard disk 12 after editing, and designating of access points. When the CPU 1 detects termination of the editing operation, it checks at step 4-1 the key input again.

Operation of Audio Input/Output Devices 8-1 to 8-3

The operation of the audio input/output devices 8-1 to 8-3 will now be described referring to the flowchart of FIG. 7. This flowchart may be realized by either microprogram control or hard logic control, and there are various types of means to accomplish the function.

It is determined at step 7-1 whether or not the signal CS for designating the audio input/output devices has been sent from the CPU 1, i.e., whether the signal is active or not. When the result of the judgement is "Yes", the operation mode (record, play, stop or the like) is set by the CPU 1 at step 7-2. This setting process is to be executed in response to processing at steps 5-5 and 5-18.

When the result of the judgement at step 7-1 is "No", it is judged if the audio input/output devices 8-1 to 8-3 are in the recording mode or in the playing mode. If it is judged at step 7-3 that the devices are in the recording mode, the sequence of processes will be executed at steps 7-4 to 7-9, and if it is judged at step 7-3 that the devices are in the playing mode, the flow goes to steps 7-10 to 7-15 for execution of the sequence of processes.

A description will be given of the operation of the audio input/output devices set to the recording mode (the audio input/output devices 8-2 and 8-3 in this case). It is judged at step 7-4 if a sampling time is reached. The processing at step 7-4 will be repeated until the sampling time is reached. The audio input/output devices 8-1 to 8-3 may have hardware timers respectively, and judge the sampling time from their outputs. Or a common hard timer may be provided so that each audio input/output device can be driven by the timer output. It will be understood from the later description that the sampling frequencies of the audio input/output devices 8-1 to 8-3 may be set to values different from one another.

When the decision at step 7-4 is "Yes", the transferred analog audio signal is subject to sample holding (S/H) and A/D conversion. The audio input/output devices set the DMA transfer request DRQ active and output it to the DMA controller 10 at step 7-6.

Receiving the DMA transfer request DRQ, the DMA controller 10 outputs the response signal DAK to execute DMA transfer (the detailed operation will be described later). When the result of the judgement at step 7-7 is "Yes", the audio input/output device 8-1, 8-2 or 8-3 (the audio input/output devices 8-2 or 8-3 in this case) goes to step 7-8, where the device outputs the audio data subjected to A/D conversion via the data bus to the corresponding buffer 9-1, 9-2 or 9-3 (the buffer 9-2 or 9-3 in this case). The DMA transfer request DRQ is then set inactive at step 7-9. Therefore, the audio input/output device 8-2 or 8-3 in this case converts, every sampling period, the externally supplied analog audio signal into a digital audio signal, and transfers it to the current address of the buffer 9-2 or 9-3 which is designated by the DMA controller 10, as will be described later (refer to FIG. 10).

When it is judged at step 7-3 that the audio input/output device is set to the playing mode, the operation goes to step 7-10, where the DMA transfer request DRQ to the DMA controller 10 is made active. Upon receipt of the response signal DAK from the DMA controller 10 at step 7-11, the audio input/output device reads the digital audio data on the data bus at step 7-12, and then sets the DMA transfer request DRQ inactive at step 7-13. As shown in FIG. 10, through the above operation, the content of the current address of the buffer 9-1 corresponding to the track Tr1 (where the content of the Tr1 area of the hard disk 12 has been transferred and stored) will be set to the audio input/output device 8-1. The operation of the DMA controller 10 in this case will be described later. Then, it is judged at step 7-14 if the sampling time is reached. The detection of the sampling time is effected in the same manner as at step 7-4.

When it is judged at step 7-14 that the sampling time is reached, the operation goes to step 7-15, where the digital audio signal is subjected to D/A conversion and low-pass filtering operation. Then, the analog audio signal is audibly output.

The operations in the recording mode and the playing mode at a single sampling time have been described. After the processes at steps 7-9 and 7-15 have been executed, the operation returns to step 7-1 to sequentially execute the processing at the sampling time in the same manner.

Figure 11:
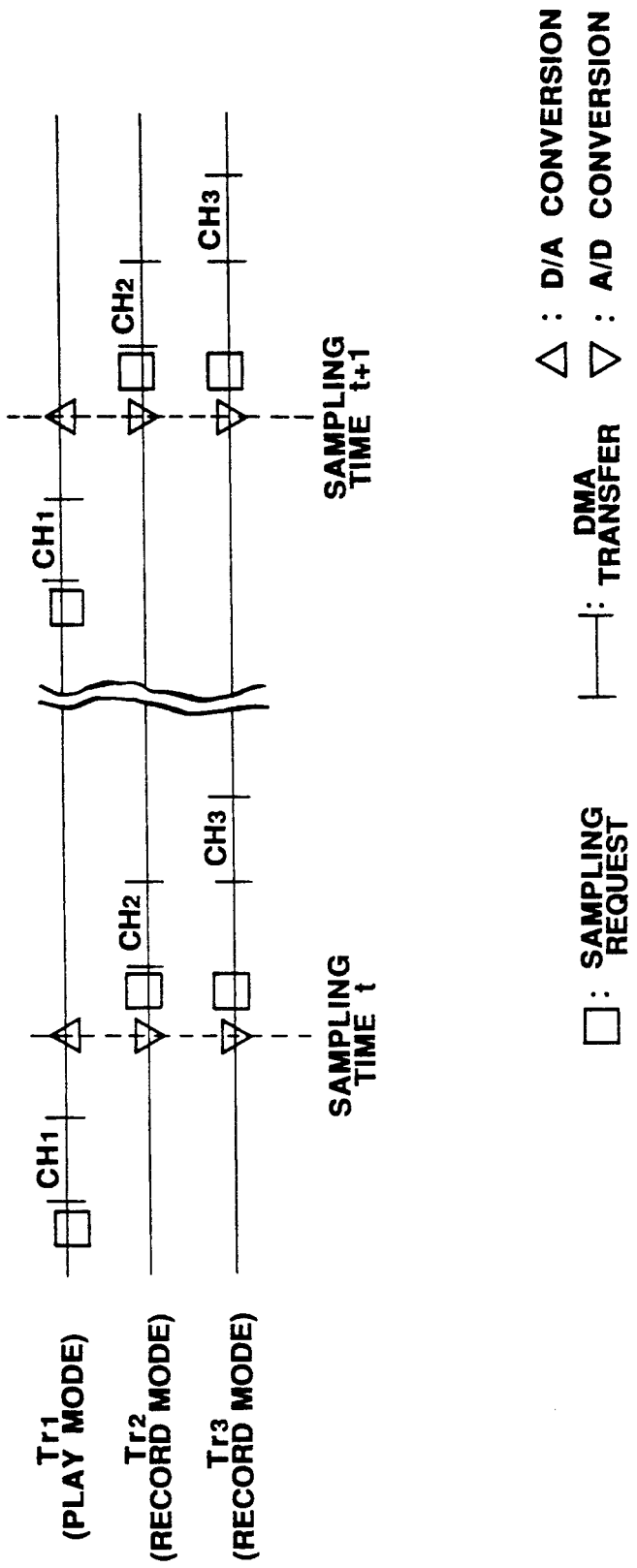
FIG. 11 is a time chart showing D/A converting operation and A/D converting operation for each track, and a DMA transfer in the digital recorder of FIG. 1.

FIG. 11 is a time chart of the operation of the audio input/output devices 8-1 to 8-3. In this time chart, the audio input/output device 8-1 for the Tr1 is in the playing mode, and the sampling request signal (DRQ) is generated between the sampling times t and t+1. The DMA transfer is executed from the buffer 9-1 to the audio input/output device 8-1 under control of the channel CH1 in the DMA controller 10, and the D/A conversion is performed in synchronism with the sampling time t+1.

The audio input/output devices 8-2 and 8-3 of the respective Tr2 and Tr3 are in the recording mode. In synchronism with the sampling time t or t+1, A/D conversion is executed, and then the DMA transfer command is output to the DMA controller 10. The DMA transfer is executed in order of Tr2 and Tr3, (because the priority order is CH1>CH2>CH3>CH4 when the DMA requests are simultaneously made), and data will be transferred from the audio input/output device 8-2 or 8-3 to the buffer 9-2 or 9-3.

Operation of DMA Controller 10

The operation of the DMA Controller 10 will be described referring to FIG. 8. The flowchart of FIG. 8 may illustrate that the service controller 108 of FIG. 2 operates under control of the microprogram control, or that the DMA controller 10 realizes its function by a hardware logic.

It is judged at step 8-1 if the designating signal CS has been supplied from the CPU 1 (i.e., if the signal CS has been made active). When the signal is active, it is judged which signal, a read signal RD or a write signal WR, is supplied from the CPU 1. When the read signal RD is supplied, the operation goes to step 8-3, where the contents of the registers, which are designated by the address signals supplied via the address bus are output on the data bus, so that the CPU 1 can read them. When the write signal WR is supplied, the operation goes to step 8-4, where desired data will be set to the designated register via the data bus. The processes at steps 8-3 and 8-4 correspond to those at steps 5-5 and 5-18 in the main routine operation of the CPU 1. Accordingly, the desired data will be set to the registers 104 and 105 of FIG. 2 respectively through the process at step 8-4.

When the CPU 1 terminates the accessing to or the programming of the DMA controller 10, the designating signal CS is set inactive, and the operation goes from step 8-1 to step 8-5.

It is judged at step 8-5 if the DMA transfer requests DRQ1 to DRQ3 are supplied from tee respective audio input/output devices 8-1 to 8-3, or if the DMA transfer request DREQ (DRQ4) is supplied from the HD controller 11. When the request is sent from any of the components, the operation goes to step 8-6, where the DMA enable signal DMAENB is set to "1" or active. Accordingly, only the DMA controller 10 uses the address bus and the data bus in the DMA unit, disabling any access from the CPU 1.

When multiple requests are made, the DMA controller 10 successively selects channels at step 8-7 in priority order of the channel, from CH1 down to CH4. In FIG. 11, for instance, though the data transfer requests are simultaneously made from the audio input/output devices 8-2 and 8-3 of the respective Tr2 and Tr3 immediately after the sampling operation, the DMA transfer of the CH2 is executed first because the Tr2 is given priority over the Tr3. As will be understood from the later description, since the CH4 is given the a lowest priority, when a data transfer request is made from any of the audio input/output devices 8-1 to 8-3 while the data transfer is going on between the hard disk 12 and one of the buffers 9-1 to 9-3, the data transfer to the audio input/output device will be carried on by priority.

Then, the DMA controller 10 outputs at step 8-8 the current address (the content of the current address register of CH2 of the address register 104) of the selected channel (the CH2 in this case) to the address bus. Referring to the content of the control register 105 of the selected channel (CH2 in this case), the DMA controller 10 decides at step 8-9 in which direction the DMA transfer is to be effected. When the DMA controller 10 decides to transfer data from the buffers 9-1 to 9-3 to the other components (I/0), the operation goes from step 8-10 to step 8-11, where the DMA controller 10 supplies the read signal RD to the buffer selected from among the buffers 9-1 to 9-3. When the data is to be transferred from the other components (I/0) to the buffers 9-1 to 9-3, the operation goes to step 8-12, where the DMA controller 10 supplies the write signal WR to the buffer selected from among the buffers 9-1 to 9-3.

At step 8-13 the response signal DAK is made active. As a result, the audio input/output device 8-2 of the Tr2 will output to the data bus audio data sampled in the processes at steps 7-7 and 7-8 of FIG. 7, and the DMA controller 10 will write the sampled audio data at the current address area in the buffer 9-2, as shown in FIG. 10.

At step 8-14, since the data transfer has been terminated, the read signal RD or the write signal WR, and the response signal DAK are set inactive. At step 8-15, the DMA controller 10 increments the content at the current address (in the address register 104 of FIG. 2) of the channel (CH2 in this case) by one. The content at the current address (in the address register 104 of FIG. 2) of the channel (CH2 in this case) is to be increased through the process at step 8-15, every time other sampled audio data is written into or read out from the buffers 91 to 9-3. The operation returns from step 8-15 to step 8-1.

In the aforementioned case (refer to FIG. 11), the audio input/output devices 8-2 and 8-3 of Tr2 and Tr3 have made request for data transfer to the DMA controller 10 and the data transfer has been executed only in Tr2. Therefore, the DMA controller 10 judges "Yes" at step 8-5. Through the processes at steps 8-7 to 8-10, 8-12 to 8-15, data is transferred in Tr3 from the audio input/output device 8-3 to the buffer 9-3 in the same manner as above.

After the data transfer is terminated, the operation advances from step 8-5 to step 8-16, where the DMA controller 10 sets the DMA enabling signal to "0" (inactive). Then, the DMA controller 10 is prohibited from occupying the data bus and the address bus in the DMA unit, allowing the CPU 1 to access these buses.

With respect to the Tr2 and Tr3, the description of the data transfer from the audio input/output devices 8-2 and 8-3 to the respective buffers 9-2 and 9-3 has been given. Concerning Tr1, the DMA controller 10 executes data transfer in the opposite direction, i.e., from the buffer 9-1 to the audio input/output device 8-1.

Figure 7:
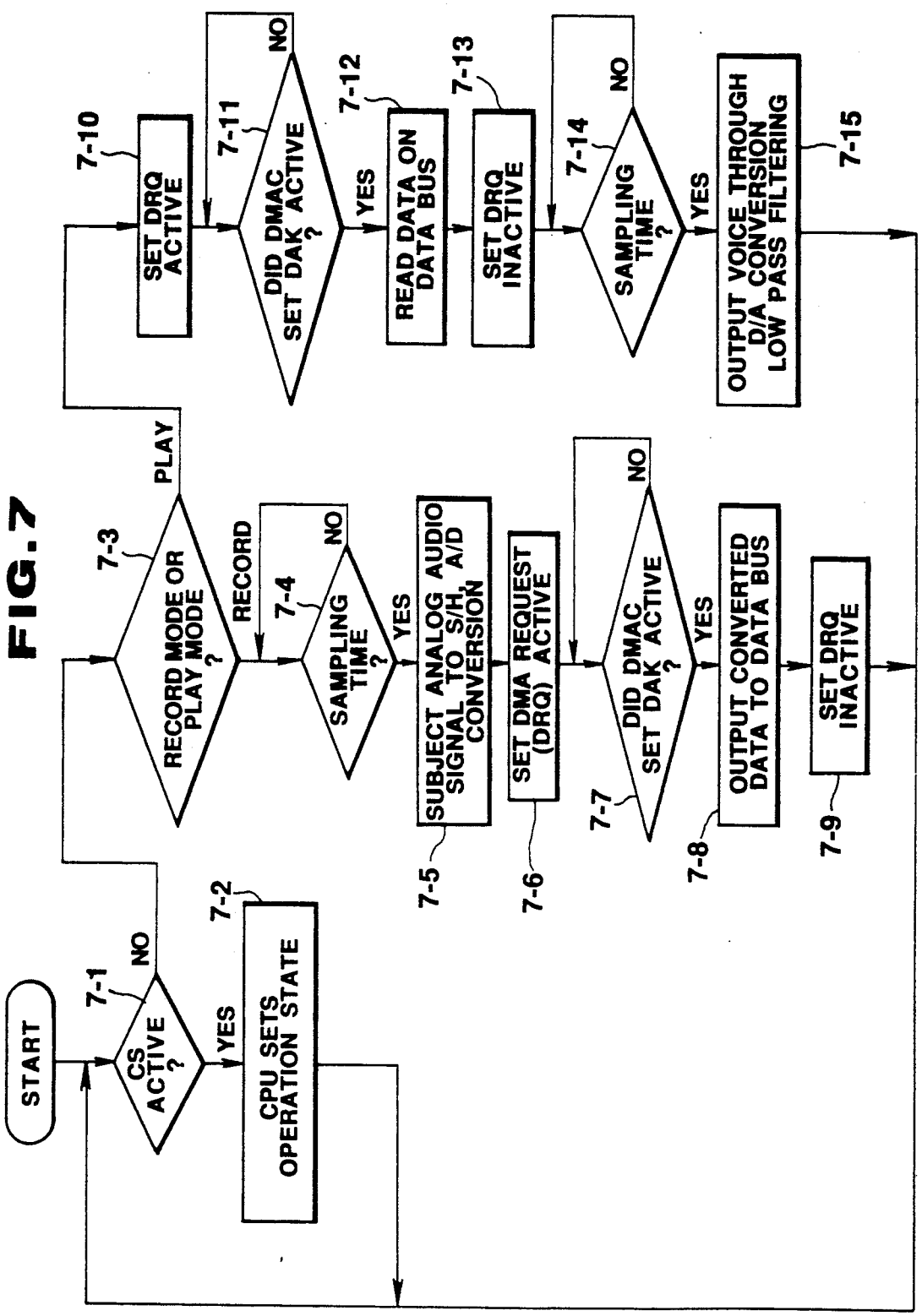
FIG. 7 is a flow chart showing operation of audio input/output units 8-1 to 8-3.

As shown in FIG. 11, the audio input/output device 8-1 corresponding to Tr1 outputs the request signal DRQ to the DMA controller 10 during the period between the sampling times t and t+1 (at step 7-10 of FIG. 7).

In response to the request signal DRQ, the DMA controller 10 performs the processes at steps 8-5 to 8-7 in done above, and supplies the audio input/output device 8-1 through the address bus with an address data indicating an address from which data is to be read out from the buffer 9-1. After execution of the processes at steps 8-9 and 8-10, the DMA controller 10 advances to step 8-11, where it supplies the read signal RD to the buffer 9-1. At step 8-13, the DMA controller 10 sets the response signal DAK to "1".

As a result, the digital audio data at the designated address in the buffer 9-1 is transferred to and written into the audio input/output 8-1 of Tr1 via the data bus. Then, the DMA controller 10 returns to step 8-1.

The DMA controller 10 executes data transfer between the hard disk 12 and the buffers 9-1 to 9-3, using the address register 104 and the control register 105 in the channel CH4. This operation will be carried out after the CPU 1 performs the interrupt routine operation of FIG. 6 to set and control the DMA controller 10 and program the HD controller 11.

The CPU 1 sets and controls the DMA controller 10 while the DMA controller 10 performs the processes at steps 8-3 and 8-4 in response to the above operation of the CPU 1. More specifically, the CPU 1 decides a track to which data is to be transferred through the channel CH4 and sets the start address (i.e., the address following the address of the block data which has previously been transferred between the buffer and the hard disk 12) of the buffer corresponding to the track decided above to the start address register (the address register 104 of FIG. 2) of CH4. The CPU 1 obtains the number of data transfer in the track Tr1 executed this time from the difference between the start address and the current address (the address incremented after the previous data transfer is executed between the buffer and the hard disk 12), and copies the current address in this track Tr1 to the start address.

The CPU 1 will execute data transfer between the buffers 9-1 to 9-3 corresponding to the track in operation and the hard disk 12 sequentially track by track, and the data transfer following the previous data transfer (block transfer) will be executed for each track. In the instance shown in FIG. 10, with respect to Tr1, data amount which corresponds to the empty space in the buffer 9-1 defined by the start address (CH1) and the current address (CH1) is to be transferred from the hard disk 12 to the buffer 9-1. (With respect to the other tracks Tr2 and Tr3, it will be apparent that, though the direction of the data transfer is opposite, data transfer will be executed from the buffers 9-2 and 9-3 to the hard disk 12 under control of the DMA controller 10.) In the buffer 9-1 in the playing mode and the buffers 9-2 and 9-3, the shaded portions correspond to the audio data which has been received.

The CPU 1 programs the HD controller 11, and then allows the HD controller 11 to request an actual data transfer and start the DMA transfer.

Detecting the data transfer request made by the HD controller 11 at step 8-5, the DMA controller 11 performs the processes at steps 8-6 to 8-9 as done above, and then goes to step 8-10, where it judges whether the data transfer from the buffers 9-1 to 9-3 to the hard disk 12 is requested or the data transfer in the opposite direction is requested. When the former transfer is requested, the operation goes to step 8-11. When the latter transfer is requested, the operation goes to step 8-12, and then the process at steps 8-13 to 8-15 is executed. In this case, since digital audio data for one sample is transferred in a single transfer operation, the block transfer will be done by repeatedly executing the processes at steps 8-5 to 8-15 for several times. The data transfer between the hard disk 12 and the buffers 9-1 to 9-3 will be further described later because the operation of the HD controller 11 is involved greatly.

When the DMA transfer is completed, the transfer requests DRQ1 to DRQ4 will not be sent forth, and the operation advances from step 8-5 to step 8-16, where the DMA controller 11 sets the DMA enabling signal DMAENB to "0" (inactive).

Operation of HD Controller 11

The operation of the HD controller 11 will now be explained referring to FIG. 9. The HD controller 11 may be realized by either a hardware logic or microprogram control; in either case, the operational flow in FIG. 9 can be accomplished.

First, it is determined whether or not the designation signal CS has been given from the CPU 1 (step 9-1); this signal is applied by the interrupt routine of the CPU 1. If the decision is negative (NO), the operation returns to step 9-1 again, but if the decision is positive (YES), the operation goes to step 9-2. At this step 9-2, it is determined whether the read signal RD or the write signal WD is sent from the CPU 1. If it is the read signal RD, the designated data in the HD controller 11 (the content of the address register or the like) is sent through the data bus to the CPU 1.

If the write signal WR has been given from the CPU 1, the operation moves from step 9-2 to step 9-4 to set the direction of DMA transfer between buffer and hard disk 12 which are the present targets for DMA transfer to be conducted by the channel CH4 of the DMA controller 10. At the next step 9-5, the access point of the hard disk 12 to be accessed is set by the access pointer for the track which the CPU 1 has acquired from the RAM 3.

At the subsequent step 9-6, the number of transfer data (the number of digital voice data) is set in an internal counter of the HD controller 11. This number of transfer data is obtained in the interrupt routine of the CPU 1, shown in FIG. 6.

As the processes at step 9-4 to 9-6 are executed, the HD controller 11 is programmed under the control of the CPU 1. Then, the HD controller 11 requests the DMA controller to transfer data (step 9-7). It should be understood from the above that upon receipt of the interrupt signal INT from the HD controller 11, the CPU 1 executes the setup and control for the DMA transfer associated with the next track (in the order of the Tr 1, Tr 2, Tr 3, Tr 1, . . . provided that the Tr 1 to Tr 3 are all presently enabled) in the DMA controller 10. Then, the CPU 1 leaves the control of the HD controller 11 and DMA controller 10, permitting these controllers to perform the DMA transfer through the mutual interaction.

Figure 8:
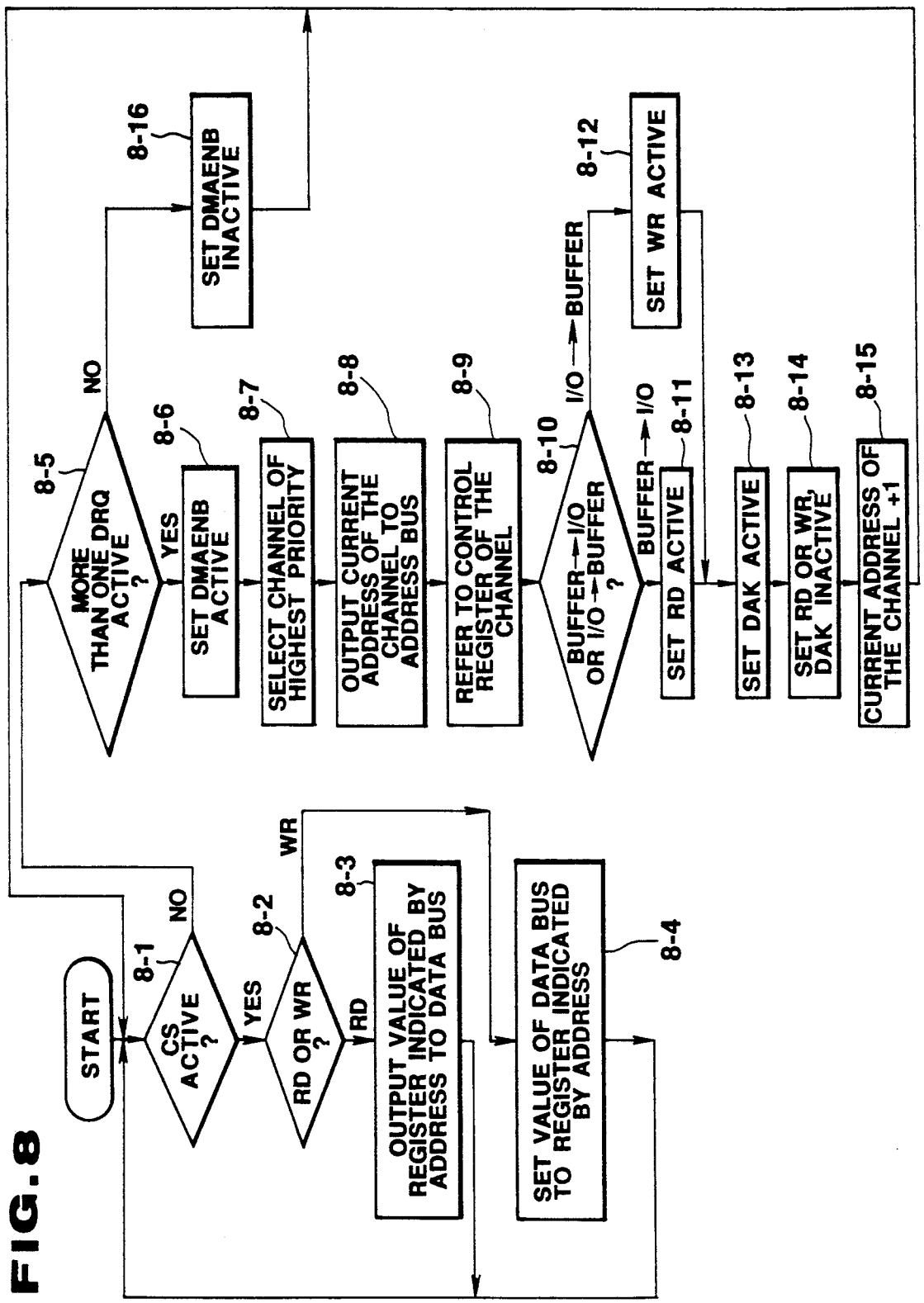
FIG. 8 is a flow chart of showing operation of the DMA controller 10 of FIG. 1.

The process of the HD controller 11 moves from step 9-7 to 9-8, and repeats the process at step 9-8 until the HD controller 11 receives the response signal DACK (DAK4) from the DMA controller 10 (see step 8-13 of FIG. 8).

When the judgment at step 9-8 is affirmative (YES), the operation advances to step 9-9, where digital voice data of one sample is transferred by the CH4 of the DMA controller 10 to decrement the transfer counter set at step 9-6 by "1" (step 9-10). According to the content of the transfer counter, it is determined at step 9-11 whether transfer of a preset number of data has been completed. When the judgment is negative (NO), the operation returns to step 9-8. Therefore, the DMA controller 10 continues receiving the transfer request DRQ4 until the transfer of the pre-set amount of data (block transfer) from the HD controller 11 is completed. In response to the transfer request, the DMA controller 10 executes the processes at steps 8-5 to 8-15 while HD controller 11 performs the processes at steps 9-8 to 9-11.

When it is judged at step 9-11 that data transfer has been done, the operation moves to step 9-12, where the data transfer request DREQ (DRQ4) from the HD controller 11 to the DMA controller 10 is set to "0" (inactive). The HD controller 11 sends the interrupt signal INT to the CPU 1 to transfer data for the next track between the hard disk 12 and one of the buffers 9-1 to 9-3 (step 9-13). In response to this interrupt signal, the CPU 1 executes the interrupt routine shown in FIG. 5, as already described above.

Operation of Data Transfer Between Hard Disk 12 and Buffers 9-1 to 9-3

As data transfer between the hard disk 12 and the buffers 9-1 to 9-3 may be understood by now through the above explanation, a description will now be given of how the DMA request is made to the DMA controller 10 and how the DMA controller 10 responds to the request in a time-shared manner, referring to FIG. 10 and 12.

As already explained, the Tr 1 is set in play mode and the Tr 2 and Tr 3 are rendered in record mode in FIG. 10. Every sampling time (fs in FIG. 12), the audio input-/output devices 8-1 to 8-3 for the respective tracks request the DMA controller 10 to transfer data between the hard disk 12 and the buffers 9-1 to 9-3.

Figure 9:
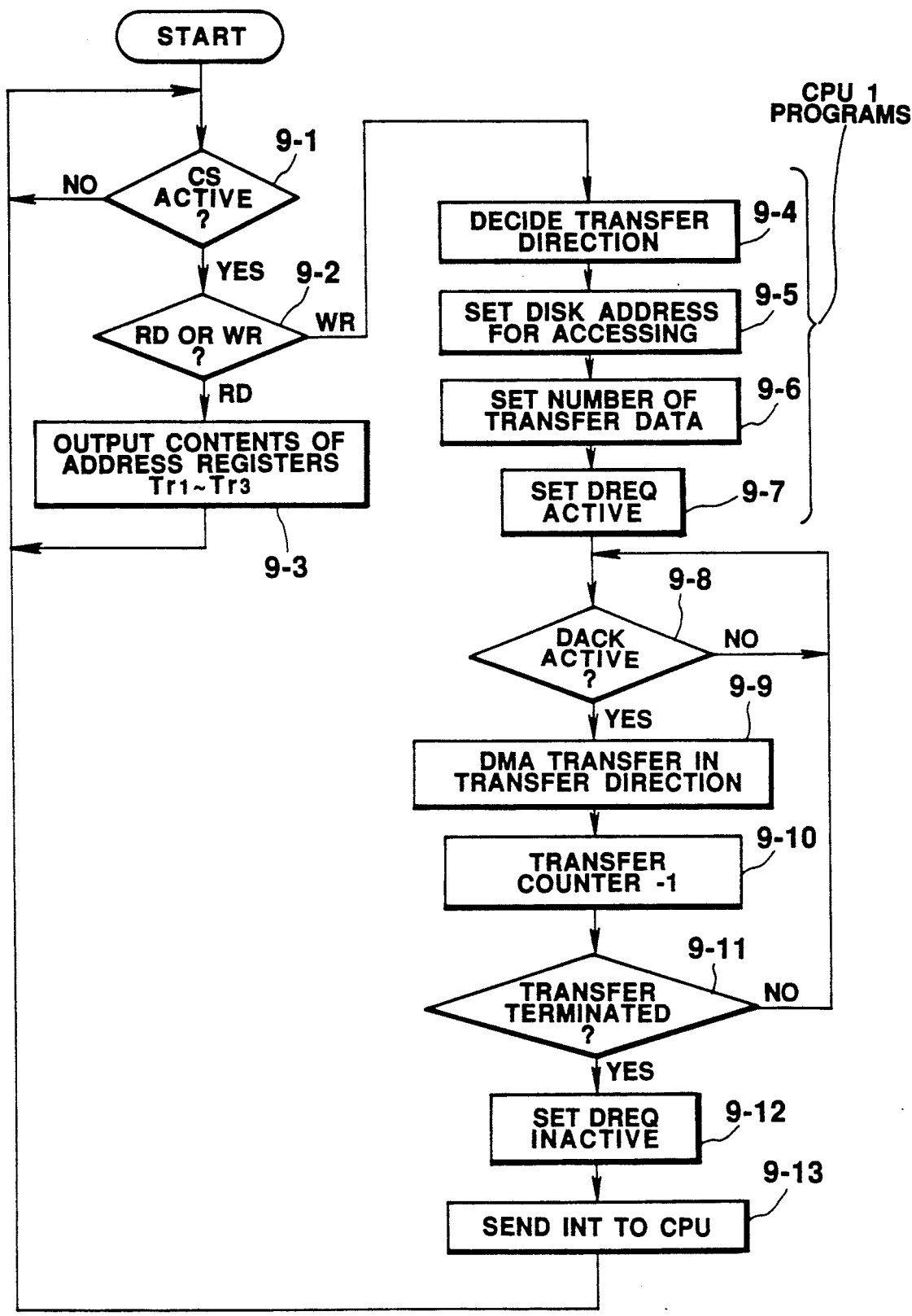
FIG. 9 is a flow chart of showing operation of the hard disk controller 10 (hereafter referred to as HD controller) of FIG. 1.

This request is made while the CPU 1 is programming the HD controller 11 (steps 9-4 to 9-7 in FIG. 9). Upon reception of the data transfer requests from the audio input/output devices 8-1 to 8-3, the DMA controller 10 output the DMA enabling signal DMAENB as described above (step 8-6 in FIG. 8), disables the CPU 1 to program the HD controller 11 (WAIT), and then allows the CPU 1 to restart the programming after the DMA transfer by the channels CH1 to CH3 is completed (see FIG. 12).

Figure 12:
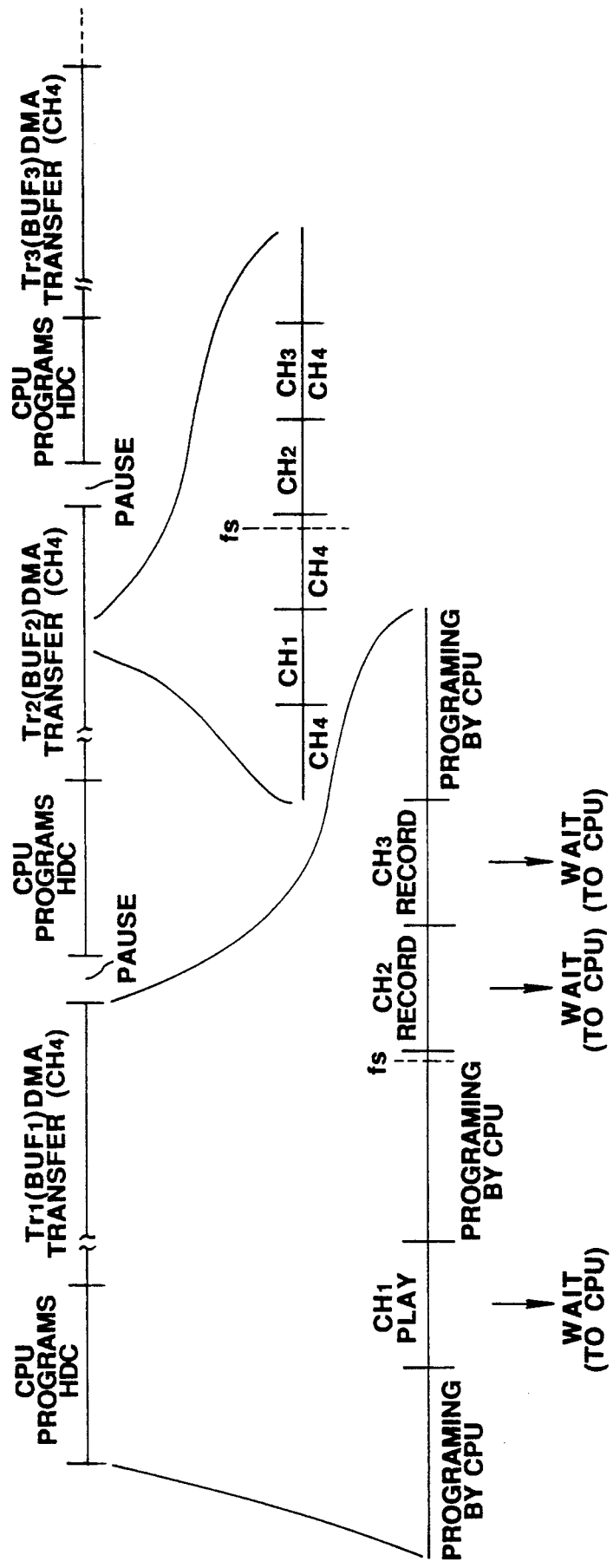
FIG. 12 is a time chart showing the DMA transfer between a hard disk 12 and buffers 9-1 to 9-3 of FIG. 1.

While data transfer between the hard disk 12 and the buffers 9-1 to 9-3 is performed by the DMA transfer through the channel CH4, data transfer requests are supplied from the audio input/output devices 8-1 to 8-3 every sampling time (fs in FIG. 12).

The DMA controller 10 this time transfers data of the channel (CH1 to CH3) which is given higher priority over the others based on the judgment made at step 8-7 in FIG. 8. Since the HD controller 11, though it keeps sending the data transfer request DRQ4 to the DMA controller 10, data does not receive any response signal DAK4 from the DMA controller 10 (see step 9-7 in FIG. 9), the HD controller 11 has to wait for the next data transfer, i.e., the process at step 7-8 is repeated.

Therefore, macroscopically, the DMA controller 10 repeats DMA transfer (block transfer) between the hard disk 12 and the buffers 9-1 to 9-3 for the Tr1, Tr2 and Tr3 as shown in FIG. 12. Microscopically, however, even during programming of the HD controller 11, the actual DMA transfer (by CH4) or a pause (idling), the DMA controller 10 executes DMA transfer (single transfer) between the buffers 9-1 to 9-3 and the audio input/output devices 8-1 to 8-3 for the individual channels CH1 to CH3 for each sampling timing. The DMA controller 10 is also designed to sufficiently deal with high-speed A/D or D/A conversion.

In the above embodiments, the CPU 1 reads out the channel identifying index data of the events to be reproduced, referring to the track schedule, but the CPU 1 may read out the channel identifying index data of the events to be reproduced, referring to the control track.

Further in the above embodiments, the CPU 1 determines the addresses of the events to be successively read out, referring to the event track schedule ETS of FIG. 14 and the event access table EAT of FIG. 15. A reproduction schedule table may be prepared in the RAM 3, which table includes start addresses and the end addresses indicating starting points and terminating points of respective events in the hard disk 12 as shown in FIG. 16, and the CPU 1 may determine the addresses of the events to be reproduced based on the reproduction schedule table thus prepared. Further, in addition to these address data, data for designating the output channels may be stored in the reproduction schedule table.

In the above embodiments, there are provided two output channels, but the recorder according to the present invention in not restricted to the above embodiments, but may be provided with any umber of output channels. A combination or distribution of the output channels may be allowed for outputting sounds. Further, the same event may be output through a plurality of output channels.

Although the several embodiments of the present invention have been described, these embodiments are simply illustrative and not restrictive. The present invention may be modified in various manners. All the modifications and applications of the present invention are within the scope and spirit of the invention, so that the scope of the invention should be determined only by what is recited in the appended claims and their equivalents.

What is claimed is:

1. A digital recorder comprising:
    audio memory medium means for storing digital audio data, the digital audio data stored in said audio memory medium means being divided into a plurality of sectioned data, each of which comprises an event;
    a plurality of audio output channel means for executing an output operation of audio signals corresponding to the digital audio data stored in said audio memory medium means;

event table memory means for storing an event table which includes event identifying index data for identifying respective events and memory location data for specifying memory locations where the respective events are stored in the audio memory medium means;

reproduction control track memory means for storing a reproduction control track in which a sequence of event identifying index data included in said event table are disposed in the order of reproduction of the events and in which channel identifying index data for designating one of said plurality of audio output channel means are assigned to the respective events to be reproduced; and channel identifying means for supplying the audio signals corresponding to digital audio data corresponding to the events to an audio output channel means which is selected from among said plurality of audio output channel means in accordance with the channel identifying index data in said reproduction control track, said digital audio data of the events being transferred from said audio memory medium means to a corresponding audio output channel means.

2. A digital recorder according to claim 1, wherein said audio memory medium means comprises a disk memory medium of a random access type.

3. A digital recorder comprising:

audio input/output means for executing an input/output operation of multiple tracks of audio signals in association with said multiple tracks;

buffer means for exchanging digital audio data for each track with said audio input/output means, and for temporarily storing the digital audio data for each track;

audio memory means of a random access type, for exchanging the digital audio data with said buffer means, and having a memory area which stores the digital audio data for multiple tracks and which is accessible for a read/write operation of the digital audio data, the digital audio data stored in said audio memory means being divided into a plurality of sectioned data, each of which comprises an event;

output means for executing an output operation to selectively output through multiple audio output channels the multiple tracks of audio signals supplied from said audio input/output means;

event table memory means for storing an event table which includes event identifying index data for identifying respective events and memory location data for specifying memory locations where the respective events are stored in the audio memory means;

reproduction control track memory means for storing a reproduction control track in which a sequence of event identifying index data included in said event table are disposed in the order of reproduction of the events, and in which channel identifying index data for designating one of multiple audio output channel means are assigned to the respective events to be reproduced;

channel control means for supplying an audio signal corresponding to the digital audio data corresponding to the event to an audio output channel means which is selected form among the multiple audio output channels in accordance with the channel identifying index data in said reproduction control track, said audio data being transferred from said audio memory means to a corresponding audio output channel; and data transfer means for executing data transfer of the digital audio data for each track between said audio input/output means and said buffer means and for executing data transfer of the digital audio data for each track between said buffer means and said audio memory means, in a time sharing manner while scheduling in accordance with a predetermined order of priority.

4. A digital recorder according to claim 3, wherein said audio memory means comprises a disk memory medium of a random access type.

5. A digital recorder according to claim 3, wherein said data transfer means executes a data transfer of the digital audio data for respective tracks between said audio input/output means and said buffer means at a rate corresponding to a sampling cycle.

6. A digital recorder according to claim 3, wherein:

said audio input/output means includes requesting means for requesting said data transfer means to exchange the digital audio data with said buffer means at a rate corresponding to a sampling frequency of the digital audio data; and said data transfer means executes a single data transfer of the digital audio data of a single sampling in response to a request from said requesting means.

7. A digital recorder according to claim 3, wherein:

said audio memory means includes requesting means for sequentially requesting said data transfer means to exchange the digital audio data with said buffer means with respect to tracks in operation; and said data transfer means executes a block transfer or the digital audio data of several samplings in response to a request from said requesting means;

8. A digital recorder comprising:

audio input means for executing an input operation of audio data;

a plurality of audio output channel means for executing an output operation of sounds;

audio data memory means for storing digital audio data supplied from said audio input means, the digital audio data stored in said audio data memory means being divided into a plurality of sectioned data, each of which comprises an event;

event address table memory means for storing an event address table which includes event identifying index data for identifying respective events and memory location data for specifying memory locations where the respective events are stored in the audio data memory means;

reproduction control track memory means for storing a reproduction control track in which a sequence of event identifying index data included in said event address table are disposed in the order of reproduction of the event, and in which channel identifying index data for designating one of said plurality of audio output channel means are assigned to the respective events to be reproduced; and channel selection means for supplying relevant events to the corresponding audio output channel means which is selected from among said plurality of audio output channel means in accordance with the channel identifying index data in said reproduction control track.

9. A digital recorder comprising:
a plurality of audio input means for executing an input operation of sounds in association with multiple tracks;
a plurality of audio output channel means for executing an output operation of sounds;
audio data memory means having a memory area for storing multiple tracks of digital audio data supplied from said audio input means, the digital audio data stored in said audio data memory means being divided into a plurality of sectioned data, each of which comprises an event;
event address table memory means for storing an event address table which includes event identifying index data for identifying respective events and memory location data for specifying memory locations where the respective events are stored in the audio data memory means;
reproduction control track memory means for storing a reproduction control track in which a sequence of event identifying index data included in said event address table are disposed in the order of reproduction of the events, and in which channel identifying index data for designating one of said plurality of audio output channel means are assigned to the respective events to be reproduced; and
channel selection means for supplying relevant events to the corresponding audio output channel means which is selected from among said plurality of audio output channel means in accordance with the channel identifying index data in said reproduction control track.

10. A digital recorder comprising:
audio input means for executing an input operation of audio data;
a plurality of audio output channel mans for executing an output operation of sounds;
audio data memory means for storing digital audio data supplied from said audio input means, the digital audio data stored in said audio data memory means being divided into a plurality of sectioned data, each of which comprises an event;
event address table memory means for storing an event address table which includes event identifying index data for identifying respective events and memory location data for specifying memory locations where the respective events are stored in the audio data memory means;
reproduction track schedule memory means for storing a reproduction track schedule in which times for starting reproduction of events to be reproduced are stored, and in which channel identifying index data for designating one of said plurality of output channel means are assigned to the respective events to be reproduced; and
channel selection means for supplying relevant events to the corresponding audio output channel means which is selected from among said plurality of audio output channel means in accordance with the channel identifying index data in said reproduction track schedule.

11. A system comprising:
audio memory means for storing digital audio data, said digital audio data stored in said audio memory means being divided into a plurality of sectioned data, each of which comprises an event;
a plurality of audio output channel means for executing an output operation of audio signals corresponding to the digital audio data store din said audio memory means;
reproduction order memory means for storing event identifying index data for identifying events in the order of reproduction of sounds;
channel data memory means for storing audio output channel identifying index data which designates which audio output channel means, among said plurality of audio output channel means, an audio signal of each of the events is to be output through, and in which the plurality of events are reproduced; and
control means for executing a control such that, in a playing mode, the relevant digital audio data is read out from said audio memory means on the basis of the event identifying index data, and the audio signal corresponding to the digital audio data is output from the audio output channel means in accordance with said audio output channel identifying index data.

12. A system according to claim 11, wherein said audio memory means comprises a disk memory medium of a random access type.

* * * * *

UNITED STATES PATENT AND TRADEMARK OFFICE
CERTIFICATE OF CORRECTION

PATENT NO. : 5,303,218

DATED : April 12, 1994

INVENTOR(S) : MIYAKE, Atsushi

It is certified that error appears in the above-identified patent and that said Letters Patent is hereby corrected as shown below:

```
Column 26, line 38 (claim 7), after "means",

";" should be   --.--

Column 28, line 24 (claim 11),

"store din"  should be   --stored in--
```

Signed and Sealed this

Thirty-first Day of October 1995

Attest:

BRUCE LEHMAN

*Attesting Officer*     *Commissioner of Patents and Trademarks*